United States Patent [19]

Iwamoto

[11] Patent Number: 5,329,410
[45] Date of Patent: Jul. 12, 1994

[54] A DEVICE FOR PREVENTING AN UNLOADED COMPACT CASSETTE ADAPTER FROM BEING INSERTED INTO A VTR

[75] Inventor: Tadashi Iwamoto, Yotsukaidou, Japan

[73] Assignee: Kabushiki Kaisha Toshiba, Kawasaki, Japan

[21] Appl. No.: 777,518
[22] PCT Filed: Mar. 29, 1991
[86] PCT No.: PCT/JP91/00418
§ 371 Date: Dec. 2, 1991
§ 102(e) Date: Dec. 2, 1991
[87] PCT Pub. No.: WO91/15849
PCT Pub. Date: Oct. 17, 1991

[30] Foreign Application Priority Data

Mar. 31, 1990 [JP] Japan .................. 2-82958

[51] Int. Cl.$^5$ ........................... G11B 5/008
[52] U.S. Cl. ........................ 360/94; 360/93
[58] Field of Search ............. 360/94, 95, 71, 93

[56] References Cited

U.S. PATENT DOCUMENTS

| 4,567,536 | 1/1986 | Tsuchiya ................. 360/94 |
| 4,622,605 | 11/1986 | Tsuruoka et al. .......... 360/94 |

FOREIGN PATENT DOCUMENTS

| 0177133 | 4/1986 | European Pat. Off. . |
| 0293202 | 11/1988 | European Pat. Off. . |
| 0311390 | 4/1989 | European Pat. Off. . |
| 0312402 | 4/1989 | European Pat. Off. . |
| 58-053066 | 3/1983 | Japan ................... 360/94 |
| 58-141476 | 8/1983 | Japan ................... 360/94 |
| 58-212680 | 12/1983 | Japan . |
| 59-45659 | 3/1984 | Japan . |
| 59-068870 | 4/1984 | Japan . |
| 61-182660 | 8/1986 | Japan . |
| 1-312765 | 12/1989 | Japan . |

OTHER PUBLICATIONS

Yamaha CD-3 "Owner's Manual", pp. 1-17, 1986.

*Primary Examiner*—Aristotelis Psitos
*Assistant Examiner*—P. W. Huber
*Attorney, Agent, or Firm*—Cushman, Darby & Cushman

[57] ABSTRACT

A tray on which a cassette is mounted can be reciprocated between a first projected position and a second set position in the horizontal direction by a carriage system. When the tray is positioned above a cassette drive section, it can be reciprocated up and down by a lifter system while holding the cassette therein. A cassette adapter can house therein a second cassette, smaller in size than the first-mentioned cassette, having a magnetic tape wound arround it, and the cassette adapter is attached to and detached from the ray. The cassette adapter is provided with an unloaded cassette detecting lever to detect whether or not the second cassette, having the magnetic tape, is inserted in the cassette adapter. A lever detecting device, which also serves as a component of the carriage system, detects that the unloaded cassette detecting lever is projected to prevent the tray from being moved from the first to the second position when the tray is on the way of being inserted into a cabinet. A control section is associated with the lever detecting lever which detects the unloaded cassette detecting lever to control the lifter system.

1 Claim, 35 Drawing Sheets

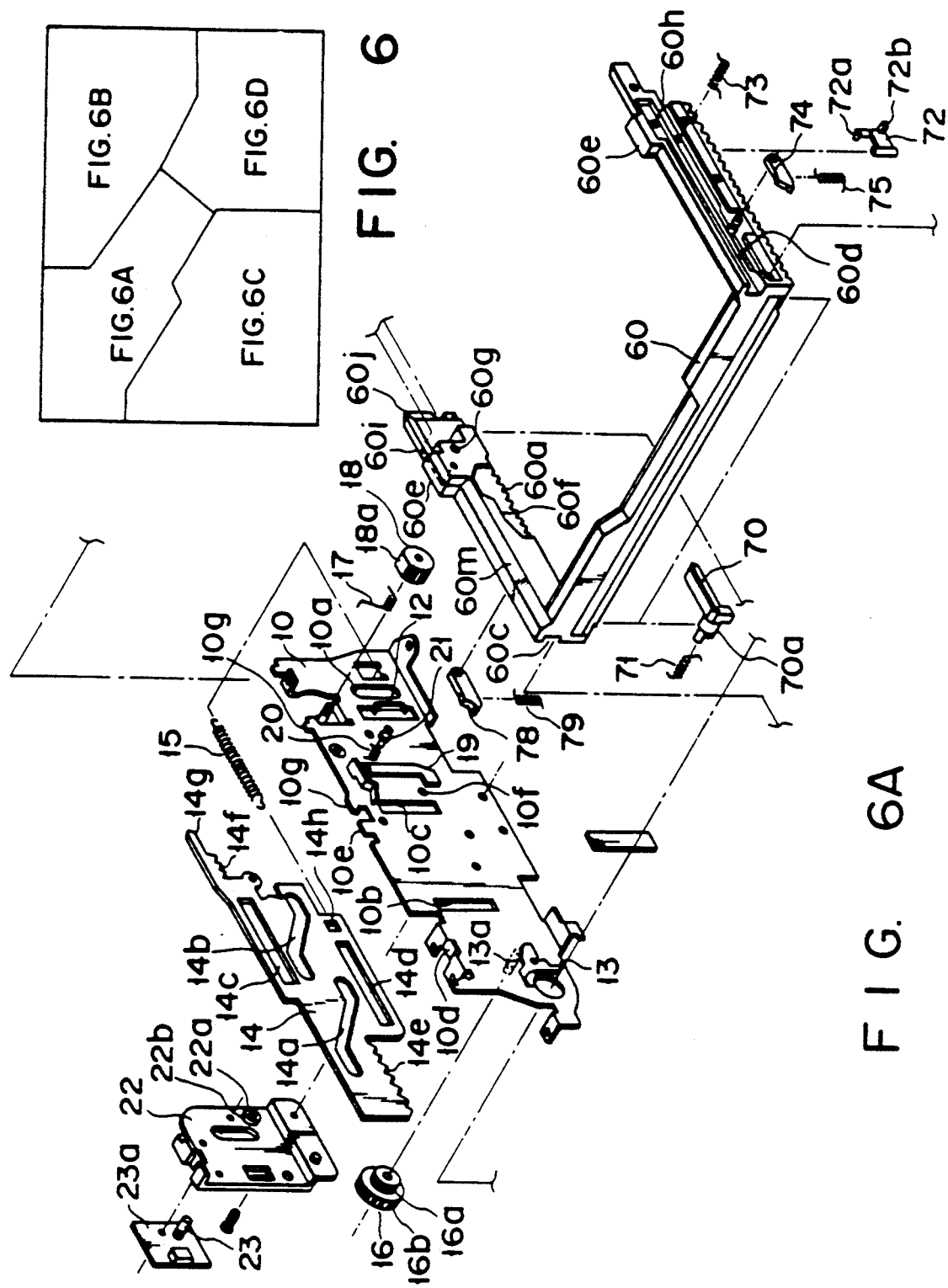

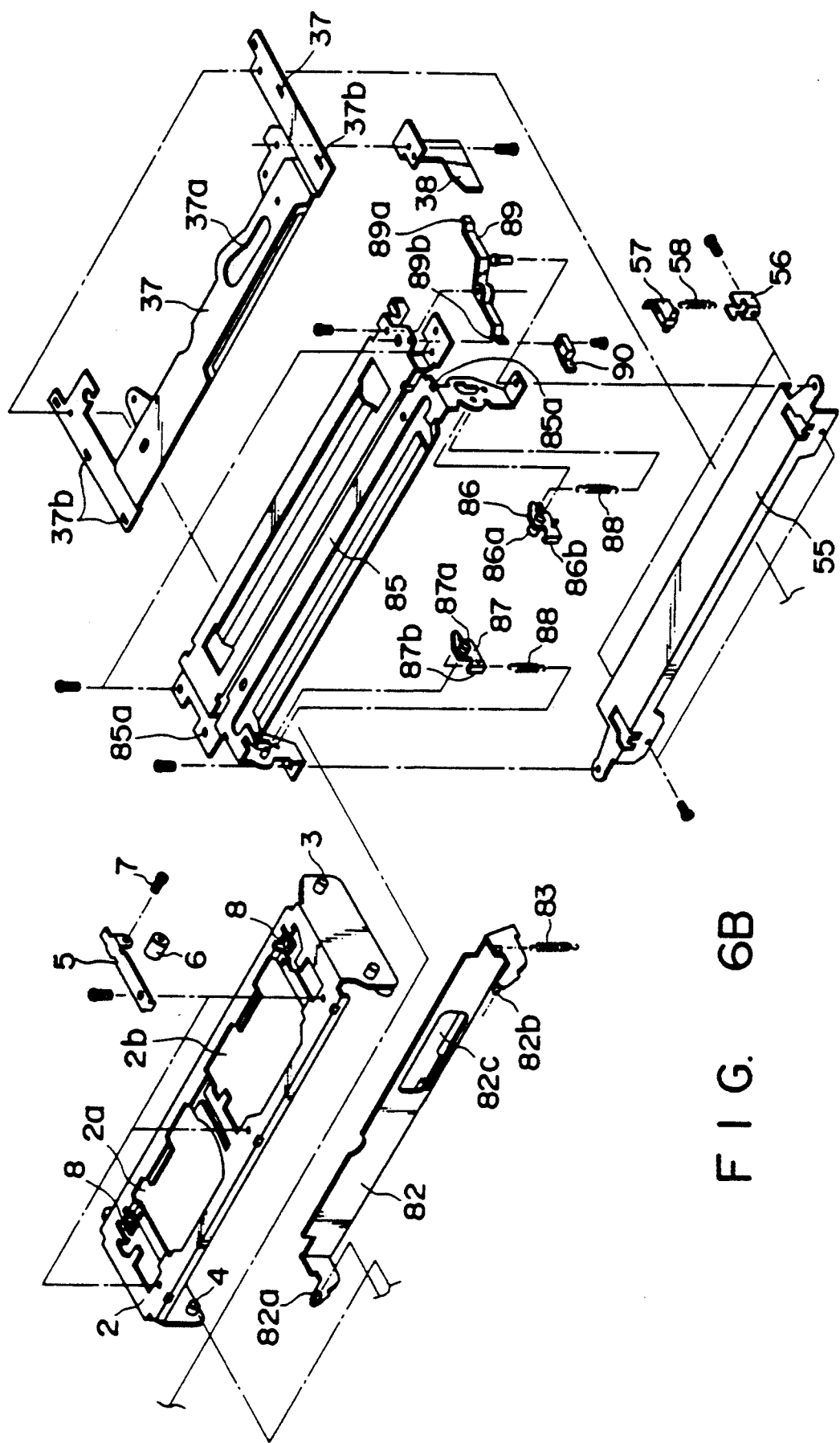
F I G. 6B

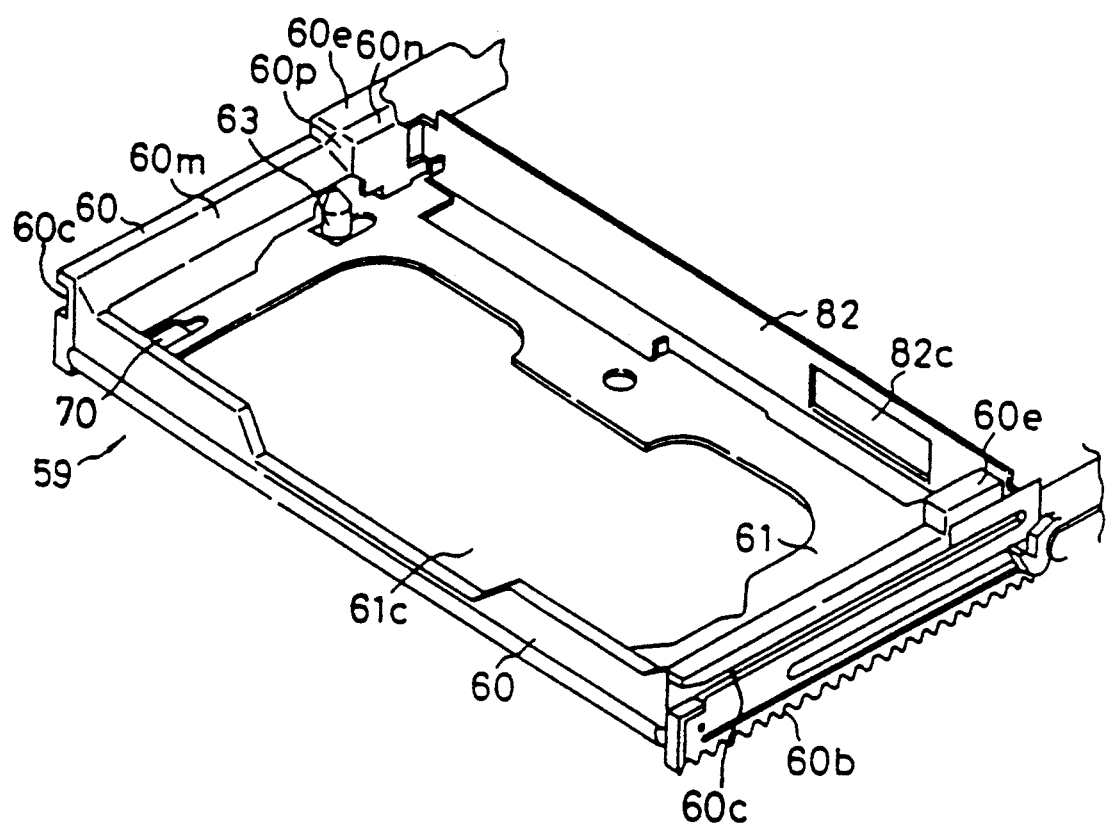
F I G. 7

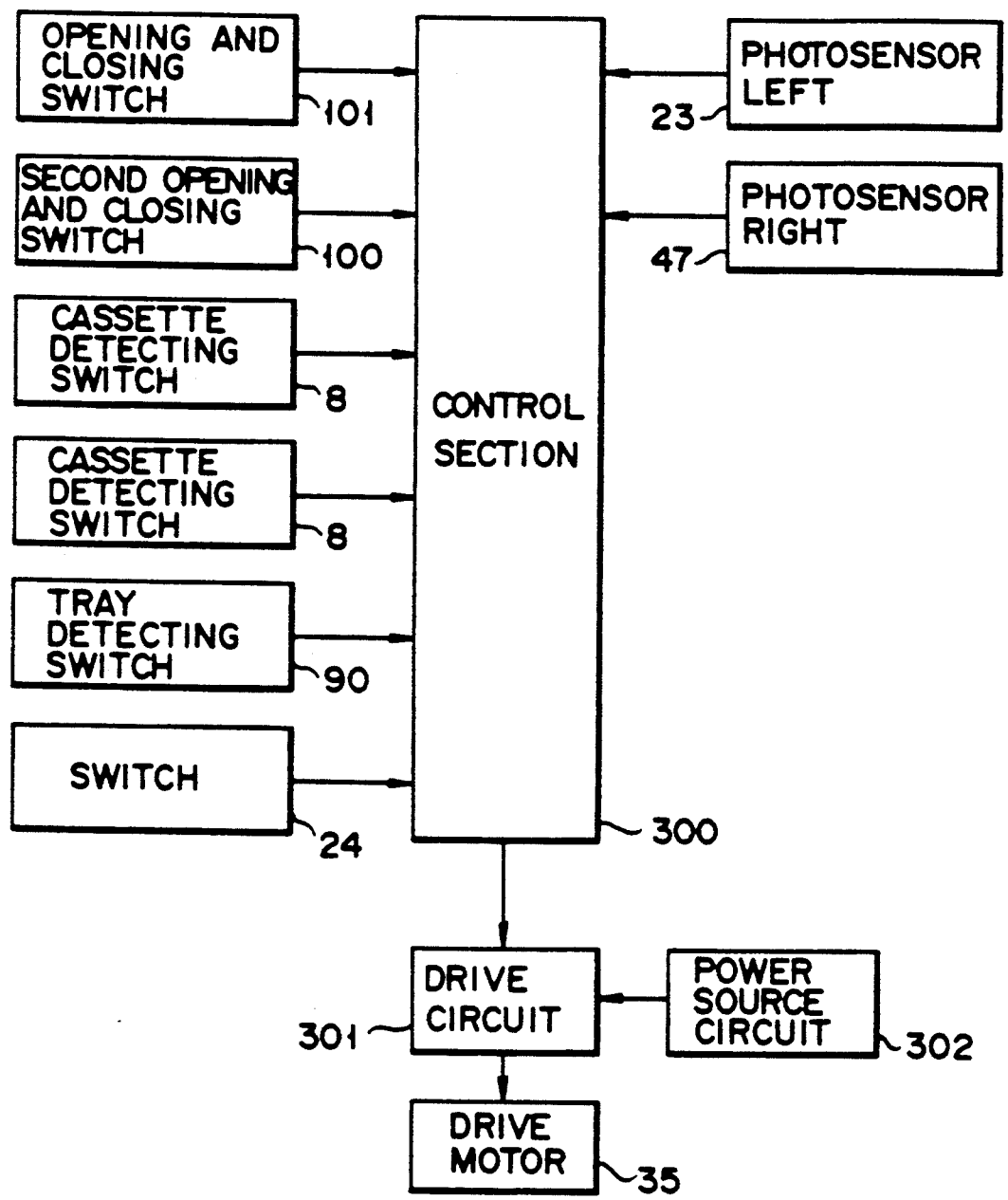
F I G. 11

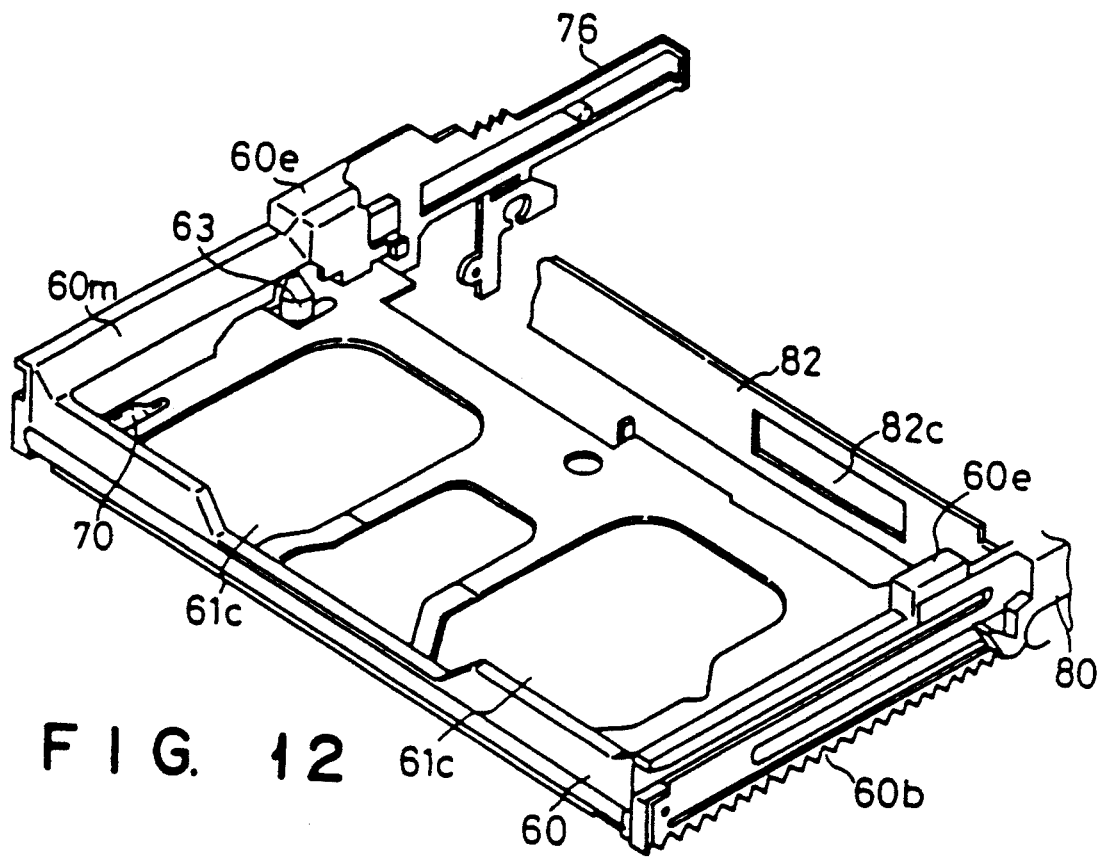
F I G. 12
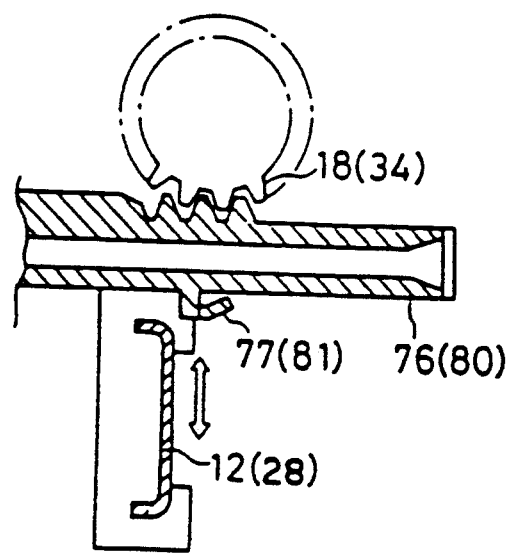
F I G. 13

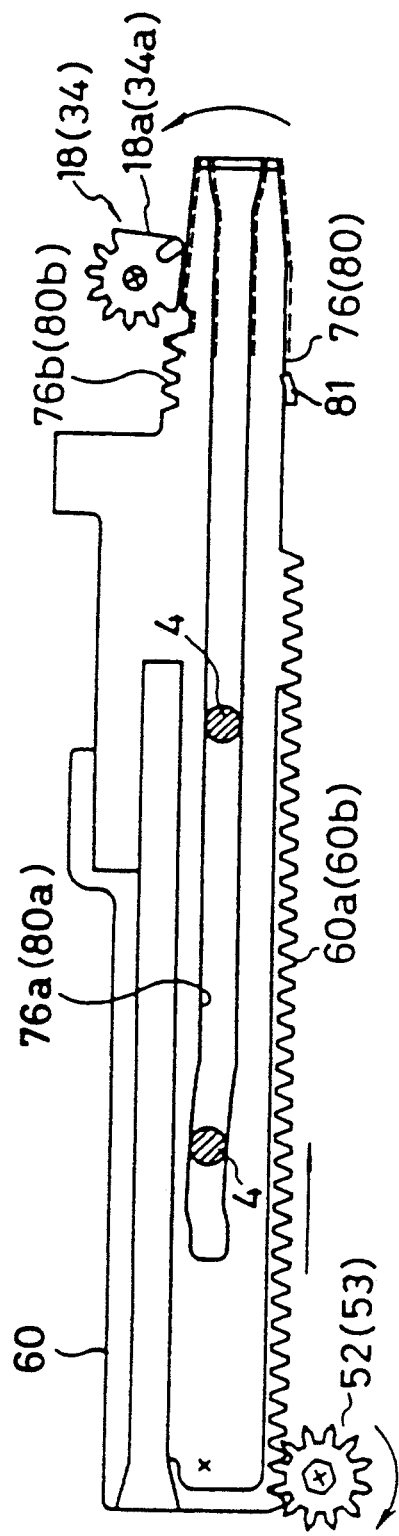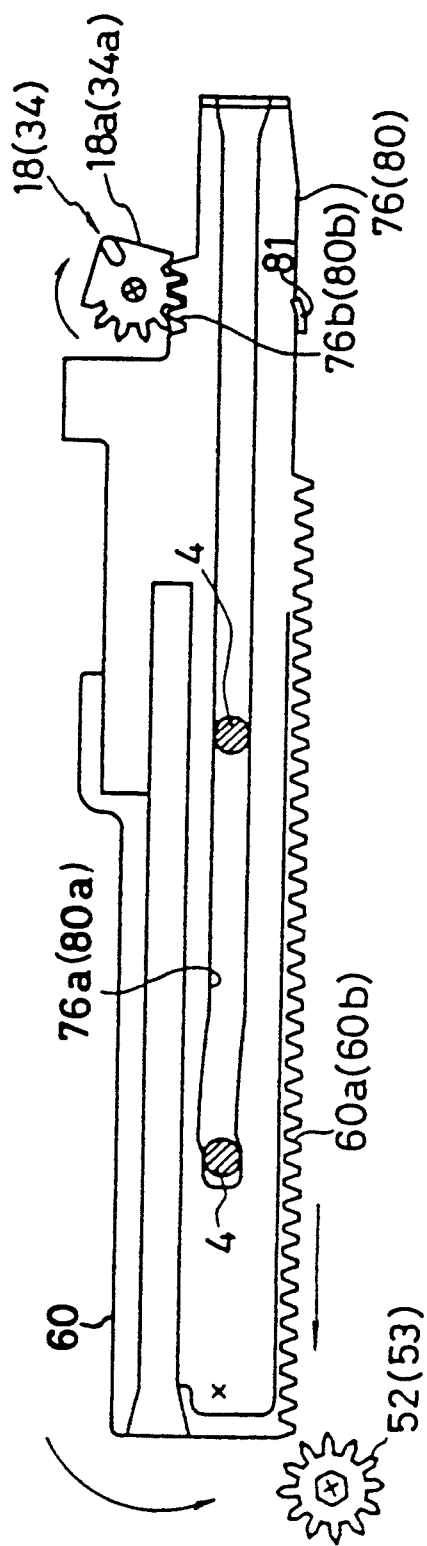

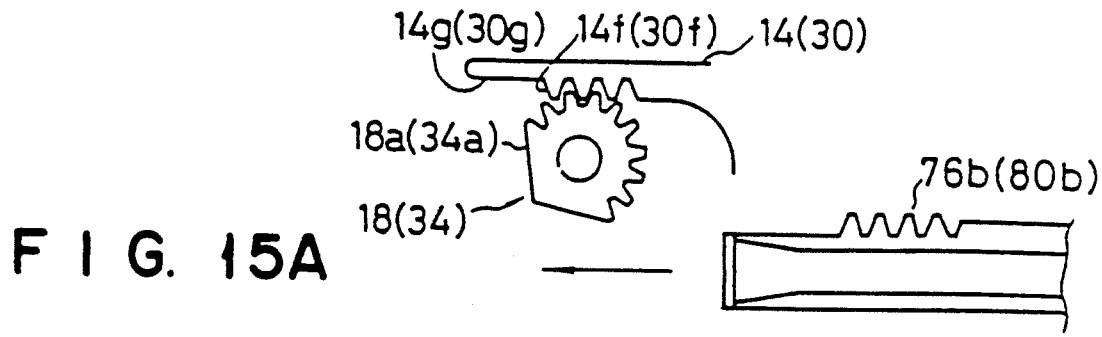
F I G. 15A
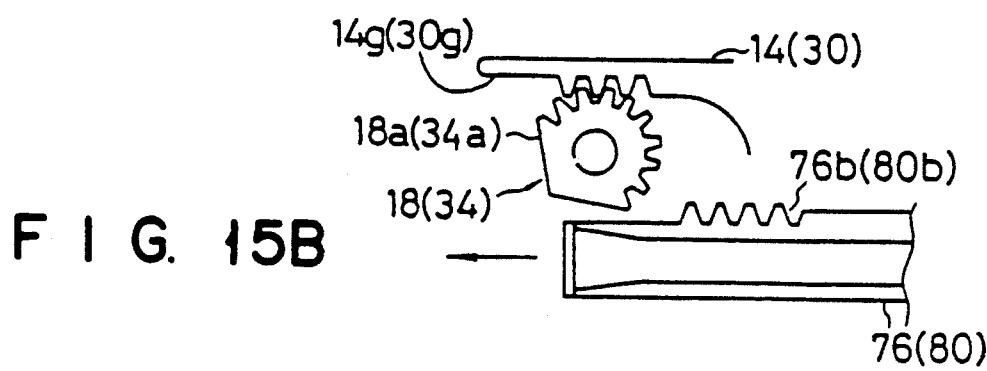
F I G. 15B
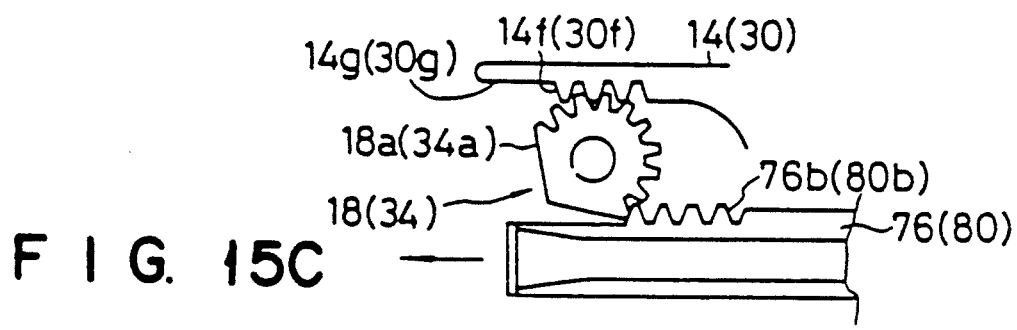
F I G. 15C
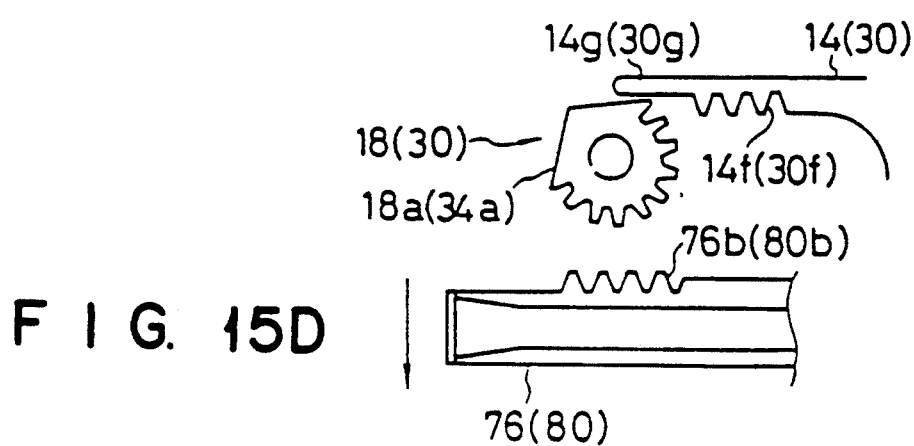
F I G. 15D

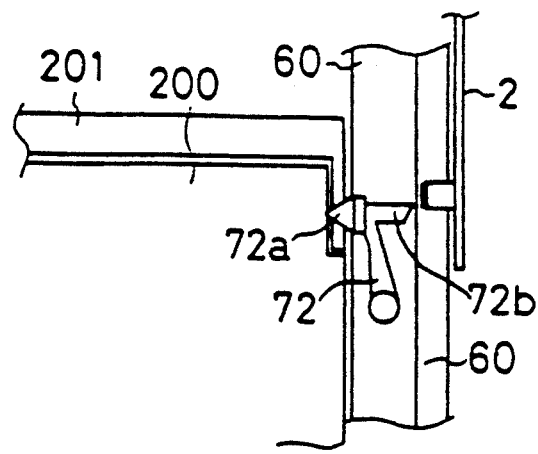
F I G. 18A
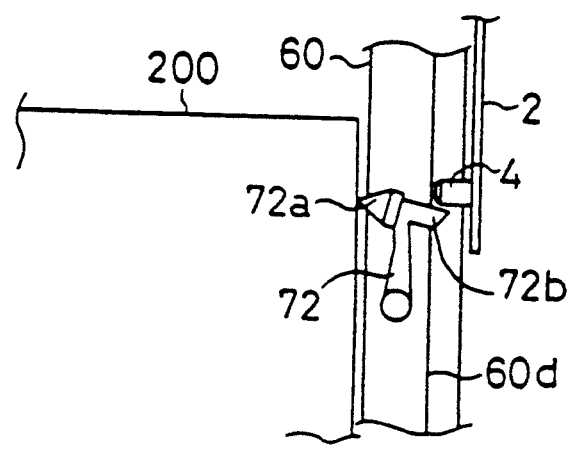
F I G. 18B

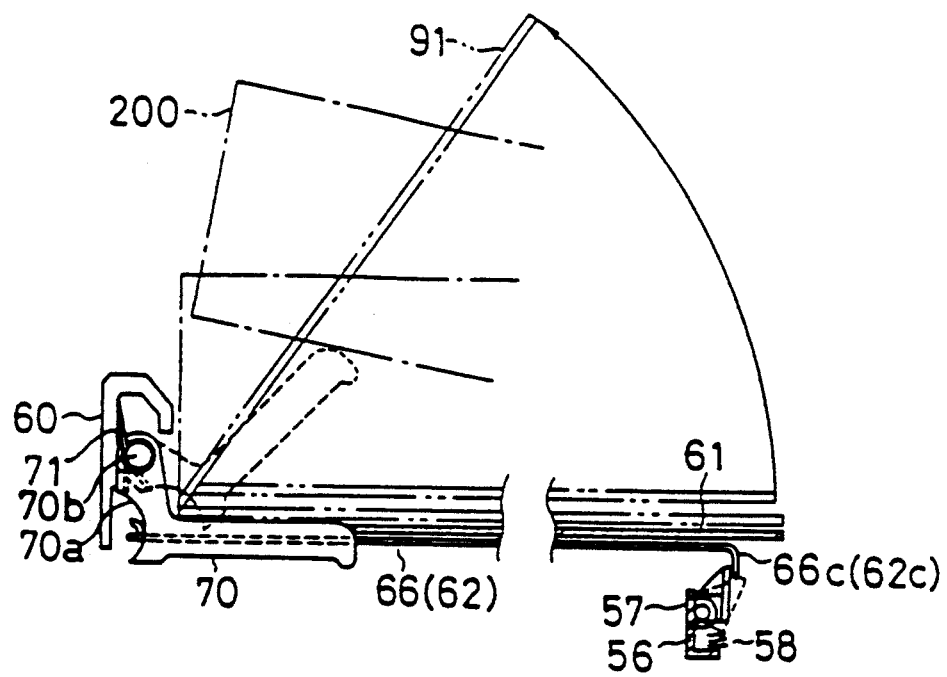
F I G. 21
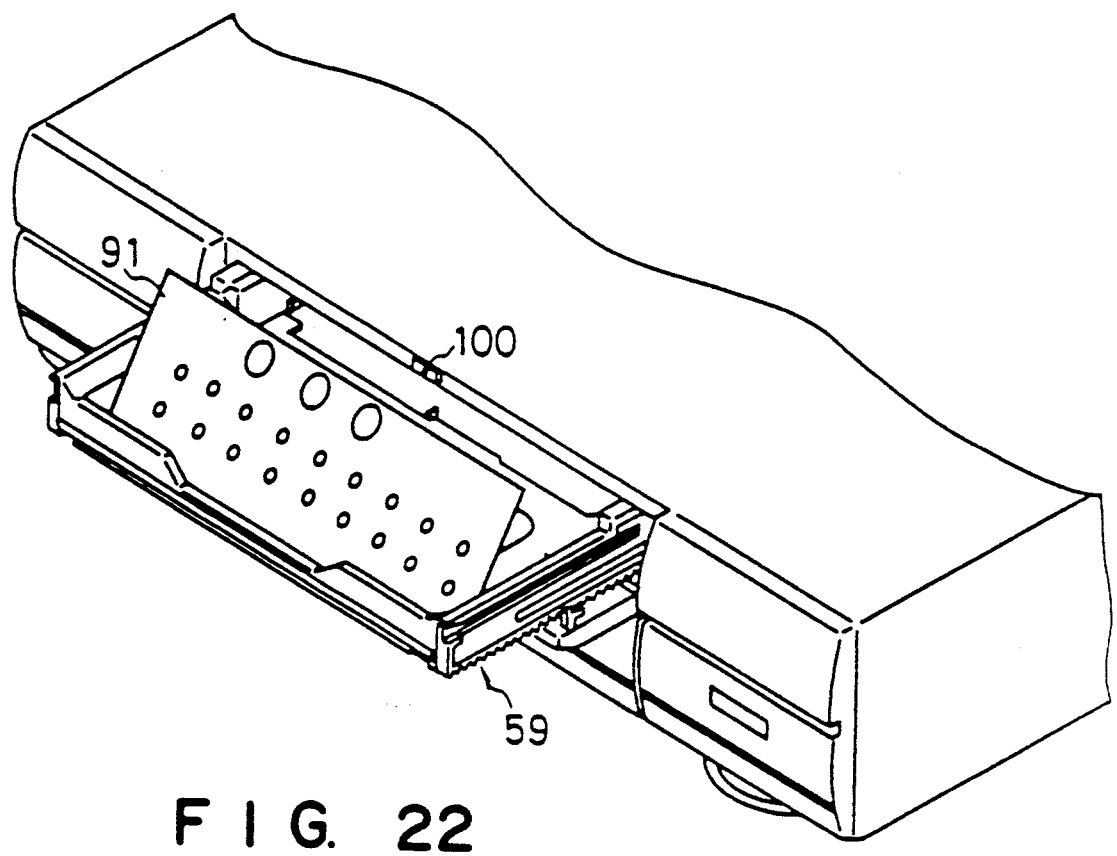
F I G. 22

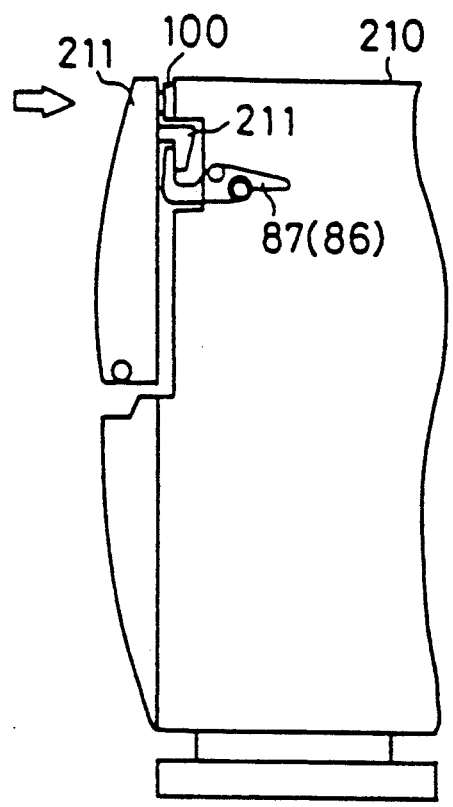
F I G. 39
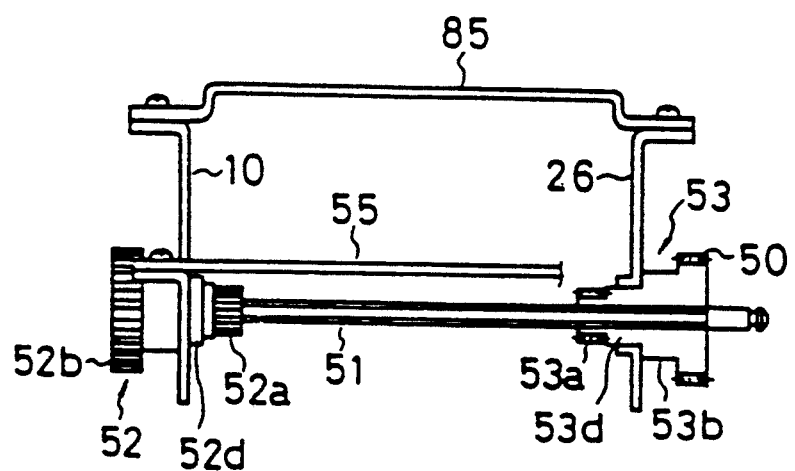
F I G. 40

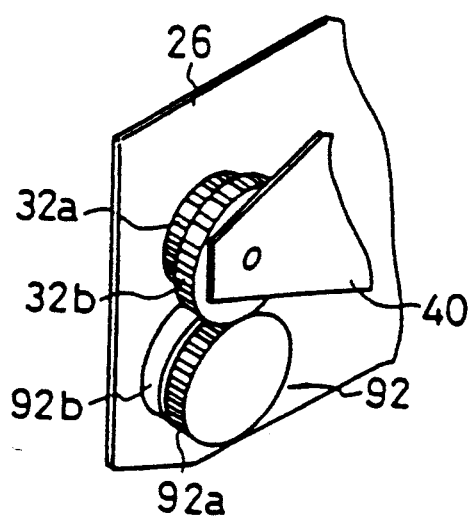
FIG. 44
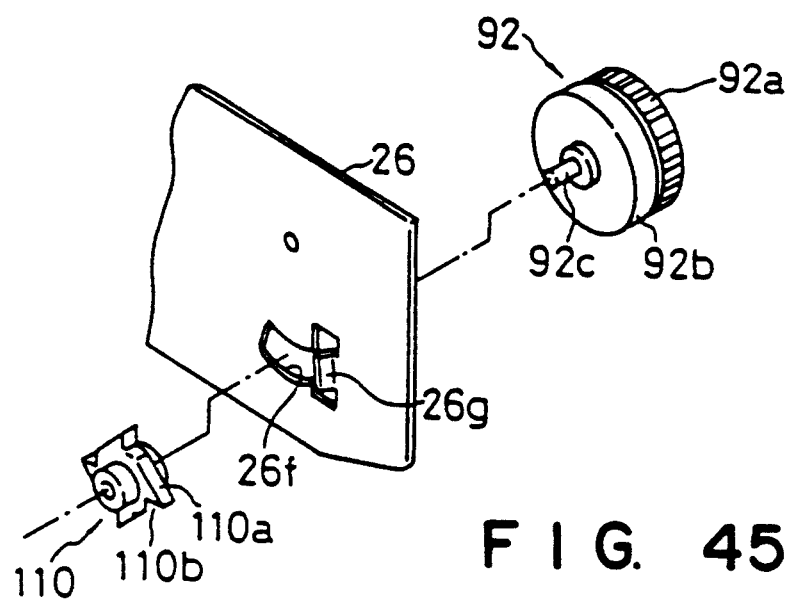
FIG. 45
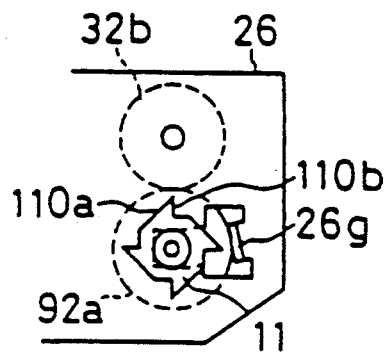 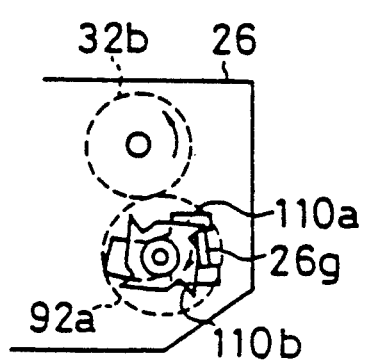
FIG. 46A        FIG. 46B

A DEVICE FOR PREVENTING AN UNLOADED COMPACT CASSETTE ADAPTER FROM BEING INSERTED INTO A VTR

FIELD OF THE INVENTION

The present invention relates to a recording and reproducing device such as video tape recorders (VTR) and more particularly, it relates to a cassette setting device for setting a cassette arround which a magnetic tape is wound, at the tape drive section in the video tape recorder.

DESCRIPTION OF THE RELATED ART

Those of the front loading type and of the linear skating type are well-known as the conventional cassette setting devices for the VTRs. In the case of the cassette setting device of the front loading type, the cassette horizontally inserted into the cabinet through a slot thereof is received and carried to the tape drive section in the cabinet by a carriage system and the cassette thus carried to the tape drive section is then carried by the carriage system to be picked up out of the cabinet through the slot thereof. In the case of the cassette setting device of the linear skating type, the whole of the tape drive section in the cabinet is carried outside the cabinet and the cassette is set directly at the tape drive section.

In the former case, however, it is enough only to place the cassette at the carriage system in the cabinet but it is difficult for the operator to confirm whether or not the cassette is then reliably carried and set at the tape drive section in the cabinet. This setting of the cassette in the cabinet therefore cannot satisfy the users. In the latter case, the users are satisfied in that they can reliably set the cassette at the tape drive section, but the whole of the tape drive system must be moved into and out of the cabinet. This makes the structure of the carriage system and the tape drive section quite complicated.

It is asked therefore to provide a cassette setting device that is simple in structure and capable of reliably setting the cassette at the tape drive section in the cabinet as seen in the case of the conventional linear skating type.

A cassette setting device of the tray type is now imagined as the one to meet the need, wherein a tray for carrying and holding the cassette is so arranged as to be freely inserted into and pulled out of the cabinet and the cassette is set at the tape drive section in the cabinet by the tray. In the case of the cassette setting device of the tray type, it is not enough only to arrange the tray in such a way that the tray can be freely inserted into and pulled out of the cabinet. The cassette placed in the tray must be carried to the tape drive section in the cabinet and the cassette thus set at the tape drive section must then be carried outside the cabinet. This needs various kinds of component parts to organically combine the tray with the tape drive section.

It is quite difficult to directly use those component parts of the conventional front loading and linear skating types in order to organically combine the tray with the tape drive section. It is asked therefore to provide a cassette setting device having such a structure that allows the cassette to be more reliably carried into and out of the cabinet by simpler operation.

Further, it is also asked that the cassette setting device has such an arrangement that allows the well-known C cassette adapter therein to be set at the tape drive section in the cabinet instead of the cassette not housed. However, the cassette setting device of the tray type is different in mechanical arrangement from those of the conventional types. Therefore, the mechanical arrangement that allows the C cassette adapter to be set must be naturally characteristic of the cassette setting device of the tray type. When the C cassette adapter is set at the tape drive section in the cabinet under such a condition that no cassette as placed in the cassette setting device of the tray type, there is fear that mechanical systems or parts at the tape drive section including the tape end detecting sensor are damaged. It is therefore asked to provide a cassette setting device of the tray type capable of more accurately being set at the tape drive section in the cabinet even when the C cassette adapter is used while being held in the cassette setting device.

The object of the present invention is therefore to provide a cassette setting device of the tray type capable of preventing any accident from being caused at the tape drive section in the cabinet and realizing a more reliable cassette setting at the tape drive section even when the C cassette smaller in size than the normal ones is set at the tape drive section in the cabinet, using the C cassette adapter.

SUMMARY OF THE INVENTION

According to an aspect of the present invention, there can be provided a cassette setting device comprising a cassette arround which a magnetic tape is wound; a cabinet for housing therein a tape drive section at which the cassette is set; a tray arranged in the cabinet to receive the cassette therein and having a first position where tray is projected from the front side of the cabinet and a second position where the cassette is set at the tape drive section in the cabinet; a carriage system for carrying the tray between the first and the second position; a cassette adapter which houses therein a second cassette, smaller in size than the first-mentioned cassette, provided with the tape wound round it being placed in and detached from the tray instead of the first-mentioned cassette and provided with an unloaded cassette detecting lever to detect whether or not the second cassette has the tape; a lever detecting means arranged at the tray and serving to detect the unloaded cassette detecting lever of the cassette adapter to prevent the tray from being moved from the first to the second position; and control means being associated responsive to the lever detecting means which detects the unloaded cassette detecting lever to reverse the carriage system so as to project the tray to the first position.

BRIEF DESCRIPTION OF THE DRAWINGS

FIG. 6 shows how FIGS. 6A through 6D are located in a sheet, wherein FIGS. 6A through 6D are perspective views showing the cassette setting device in FIG. 1 dismantled;

FIG. 7 is a perspective view showing the tray assembly;

FIG. 11 is a block diagram showing a control system in the cassette setting device in FIG. 1;

FIG. 12 is a perspective view showing the tray assembly;

FIG. 13 is a partially sectioned view showing how tray rails of the tray assembly are located relative to shaft gears;

FIGS. 14A and 14B are side views intended to explain how the tray rails and the shaft gears are operated;

FIGS. 15A through 15D are side views intended to explain how the shaft gears are toothed with rack sliders and tray rails;

FIGS. 18A and 18B are plans intended to explain how the wrong cassette preventing system is operated;

FIG. 21 is a side view intended to explain how the pop-up system is operated;

FIG. 22 is a perspective view showing how the pop-up system is operated;

FIG. 39 is a side view showing the cassette door lock system attached to the cabinet;

FIG. 40 is a plan showing how the tray drive gears are located to carry the tray assembly;

FIG. 44 is a perspective view showing a damper;

FIG. 45 is a perspective view showing the damper dismantled in detail; and

FIGS. 46A and 46B are front views showing how the damper is operated.

PRESENTLY PREFERRED DETAILED DESCRIPTION OF THE INVENTION

An embodiment of the present invention will be described with reference to the accompanying drawings.

Figure 1:
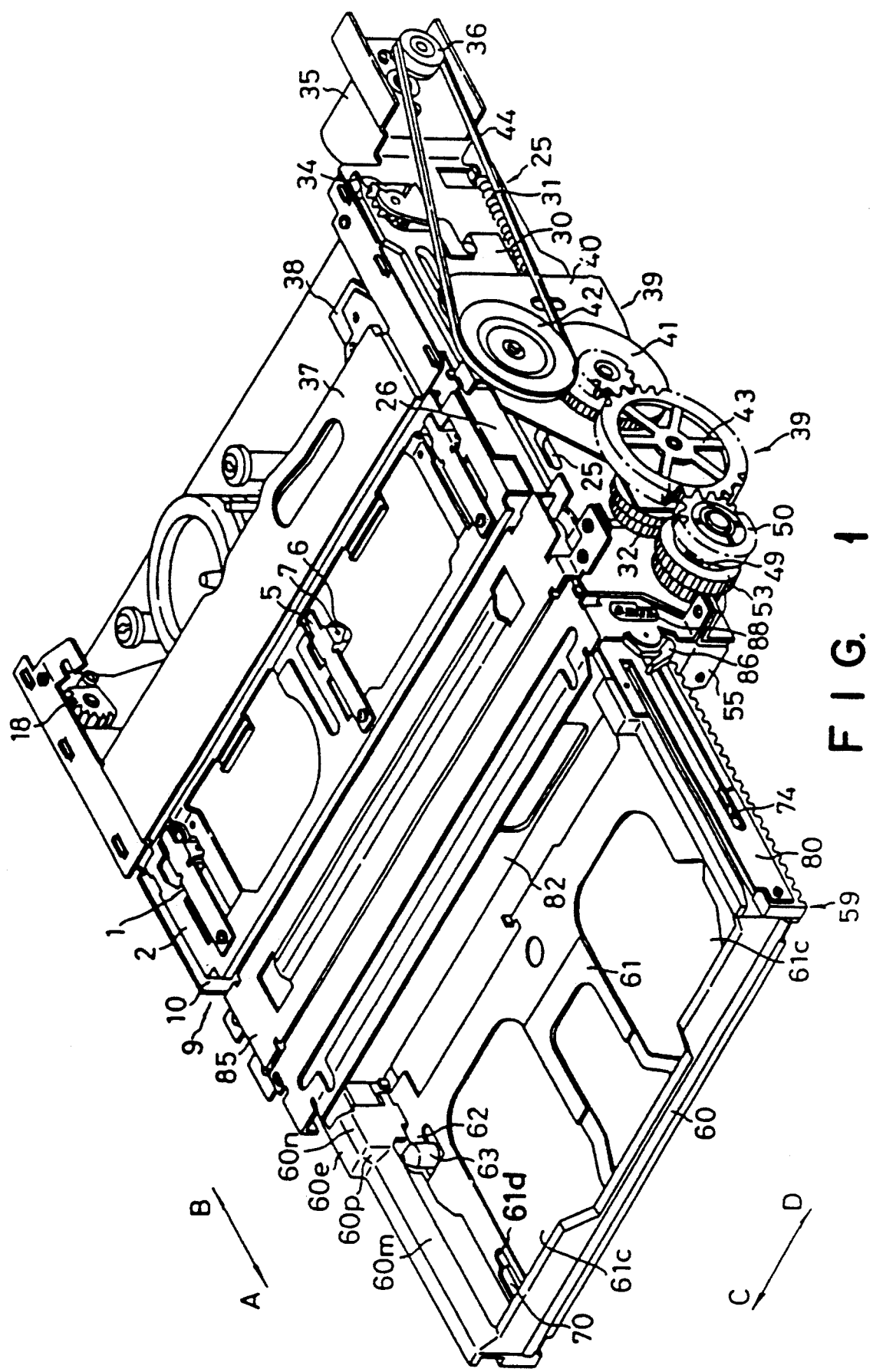
FIG. 1 is a perspective view showing the cassette setting device according to an embodiment of the present invention which projects a tray assembly from cabinet.
Figure 2:
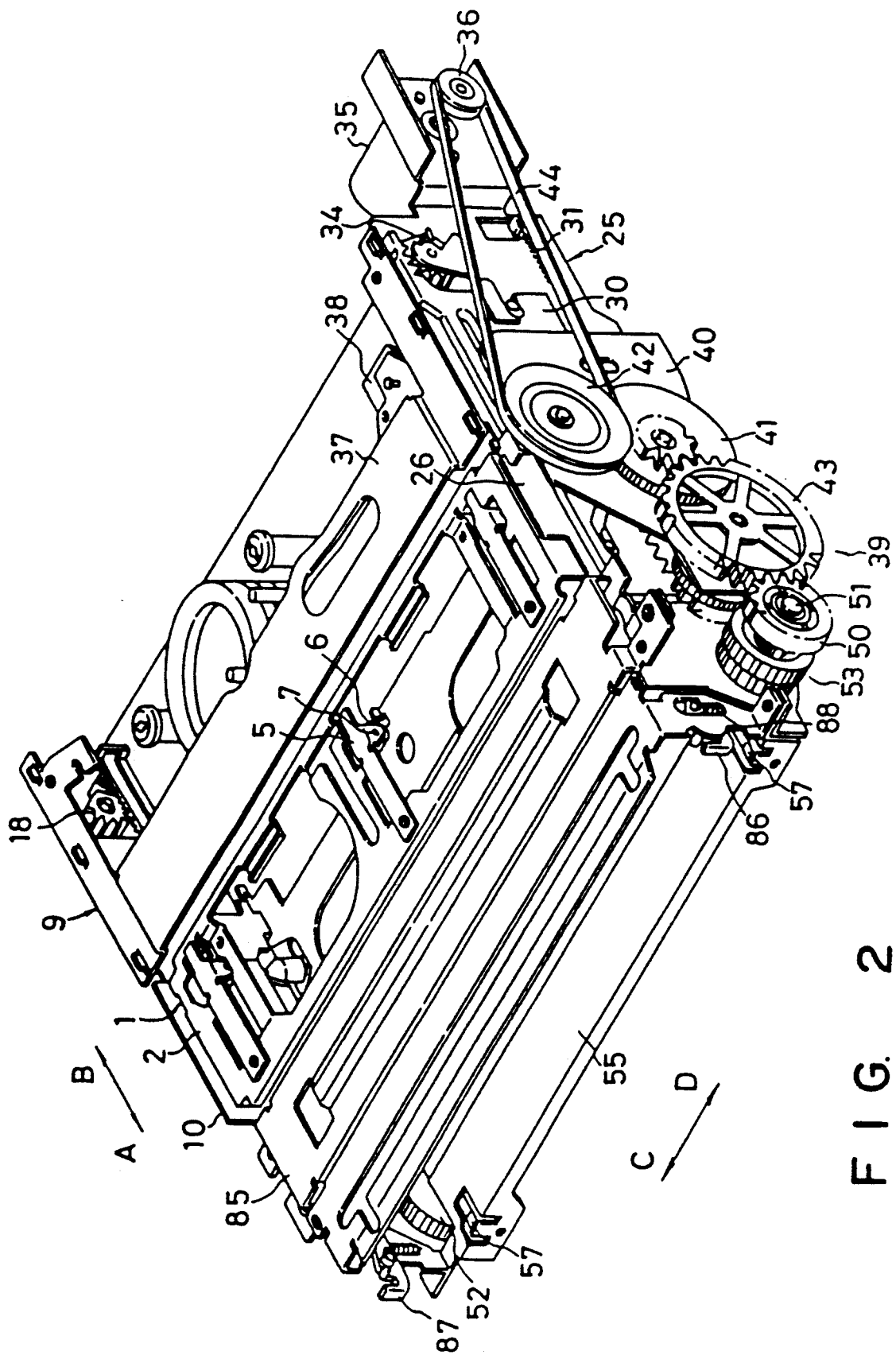
FIG. 2 is a perspective view showing the cassette setting device whose tray assembly is on the way of its being inserted into the cabinet.
Figure 3:
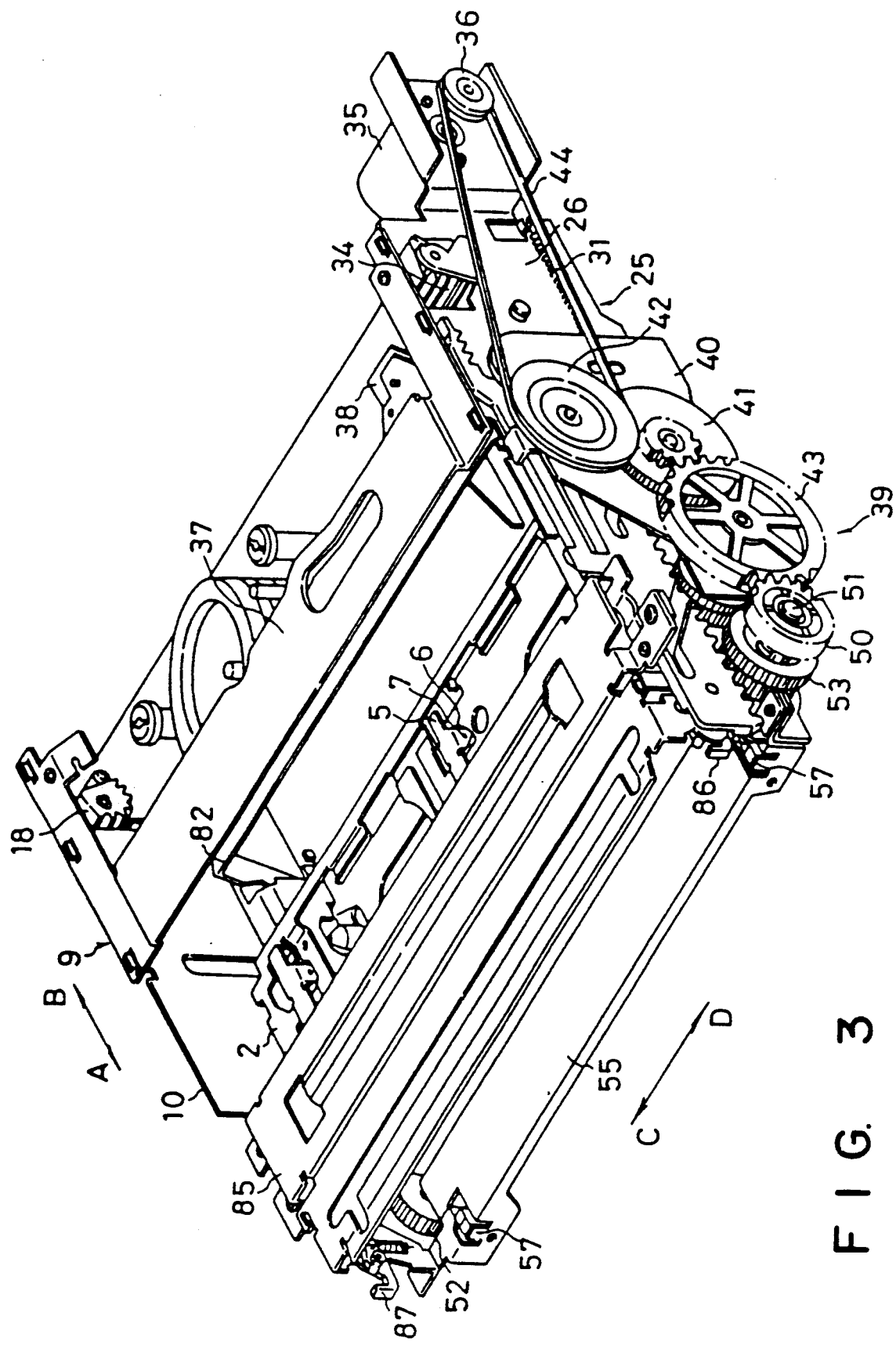
FIG. 3 is a perspective view showing the cassette setting device whose tray assembly is completely inserted into the cabinet.

FIGS. 1 through 3 show the cassette setting device according to an embodiment of the present invention, in which FIG. 1 shows that a tray to and from which the magnetic-tape-wound cassette can be attached and detached is carried or moved outside a cabinet through a slot, FIG. 2 shows the tray horizontally (or vertically) carried or moved, and FIG. 3 shows that the tray is on the way of its setting that cassette at tape drive section which is under such state as shown in FIG. 2.

Figure 4:
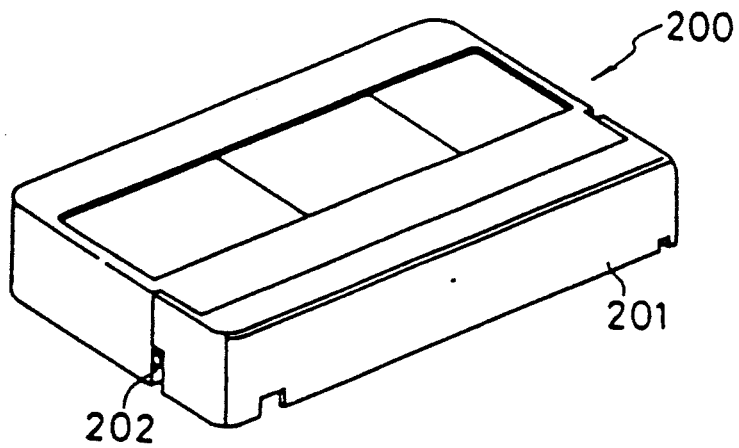
FIG. 4 is a perspective view showing a cassette tape used for the cassette setting device.
Figure 5:
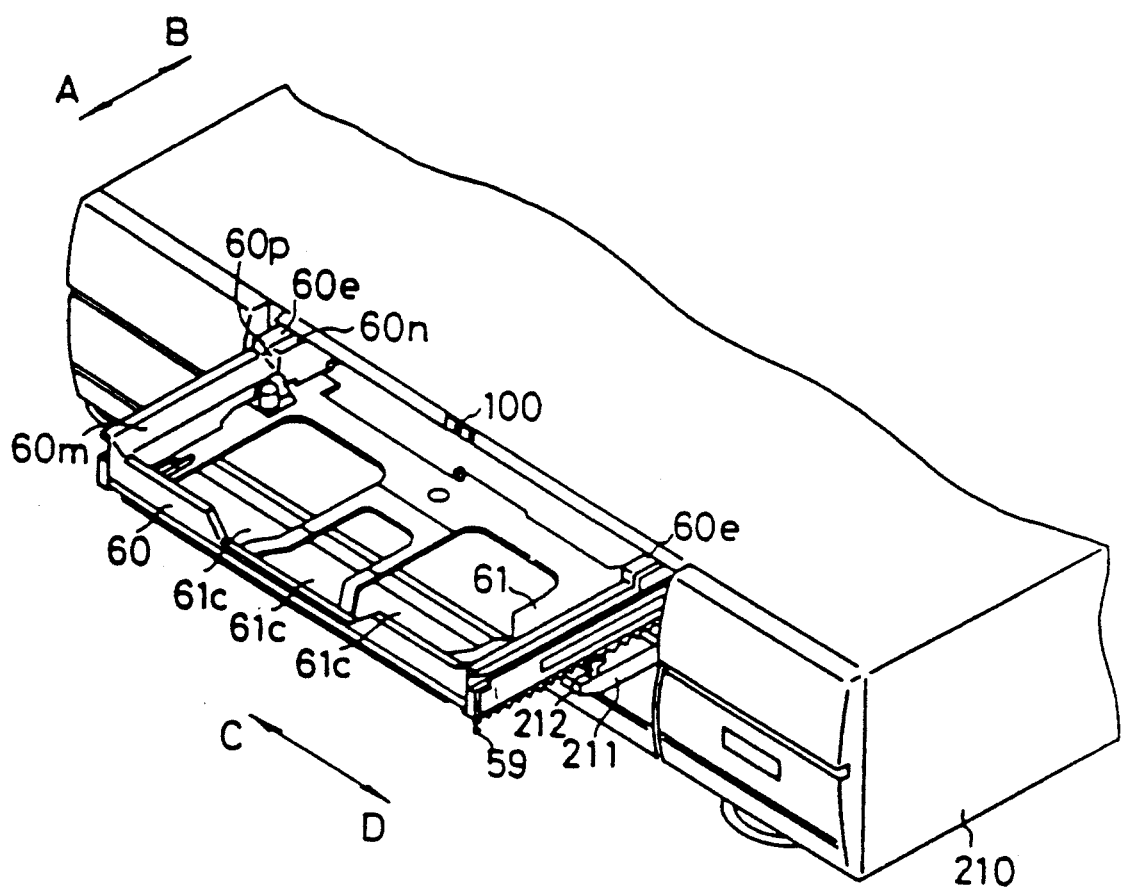
FIG. 5 is a perspective view showing the cassette setting device in FIG. 1 housed in the cabinet.

The cassette setting device according to the present invention is arranged so that a tray assembly 59 to and from which a cassette 200 shown in FIG. 4 can be attached and detached is reciprocated between a position at which it is projected outside from a cabinet 210 through a slot of the cabinet 210 as shown in FIG. 5 and another position at which it is set at the tape drive section. In short, it is horizontally carried from its projected position into the cabinet 210 and then vertically carried onto the tape drive section by a lift system. Main systems used here are a guide system for guiding the tray assembly 59 to reciprocate between these positions and a drive system for driving it to reciprocate between these positions. It will be called "slot-in" that the tray assembly 59 is carried or moved from its projected position into the cabinet to place it at its set position. Further, the following description will be made assuming that the front of the VTR set is in a direction A, its rear in direction B, its left in a direction C, its right in direction D, its upper side in a direction E and its lower side in a direction F when the operator stands at the slot side of the cabinet of the horizontally-placed VTR set through which the cassette 200 is picked out of the cabinet.

Figure 6C:
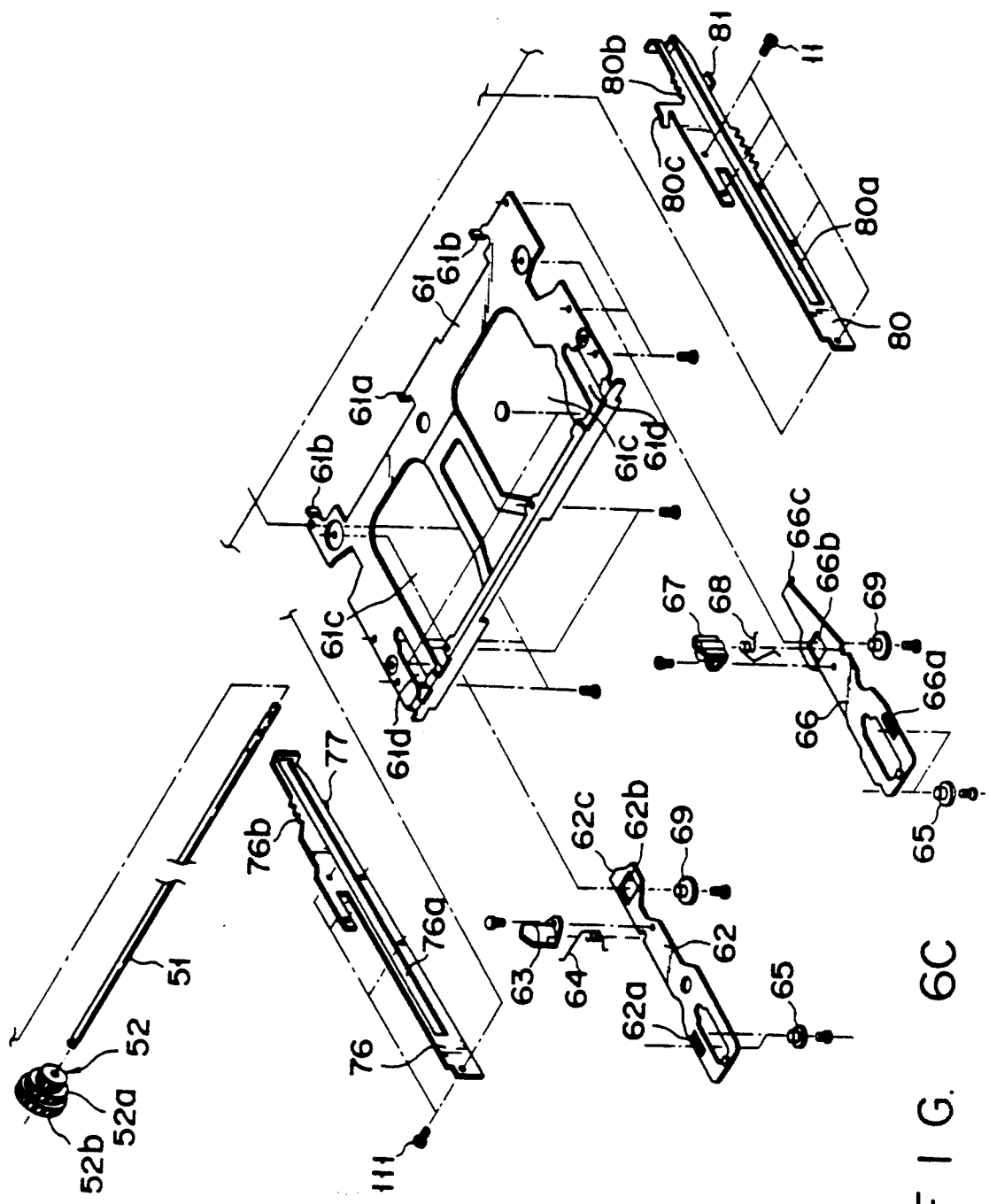
Figure 6D:
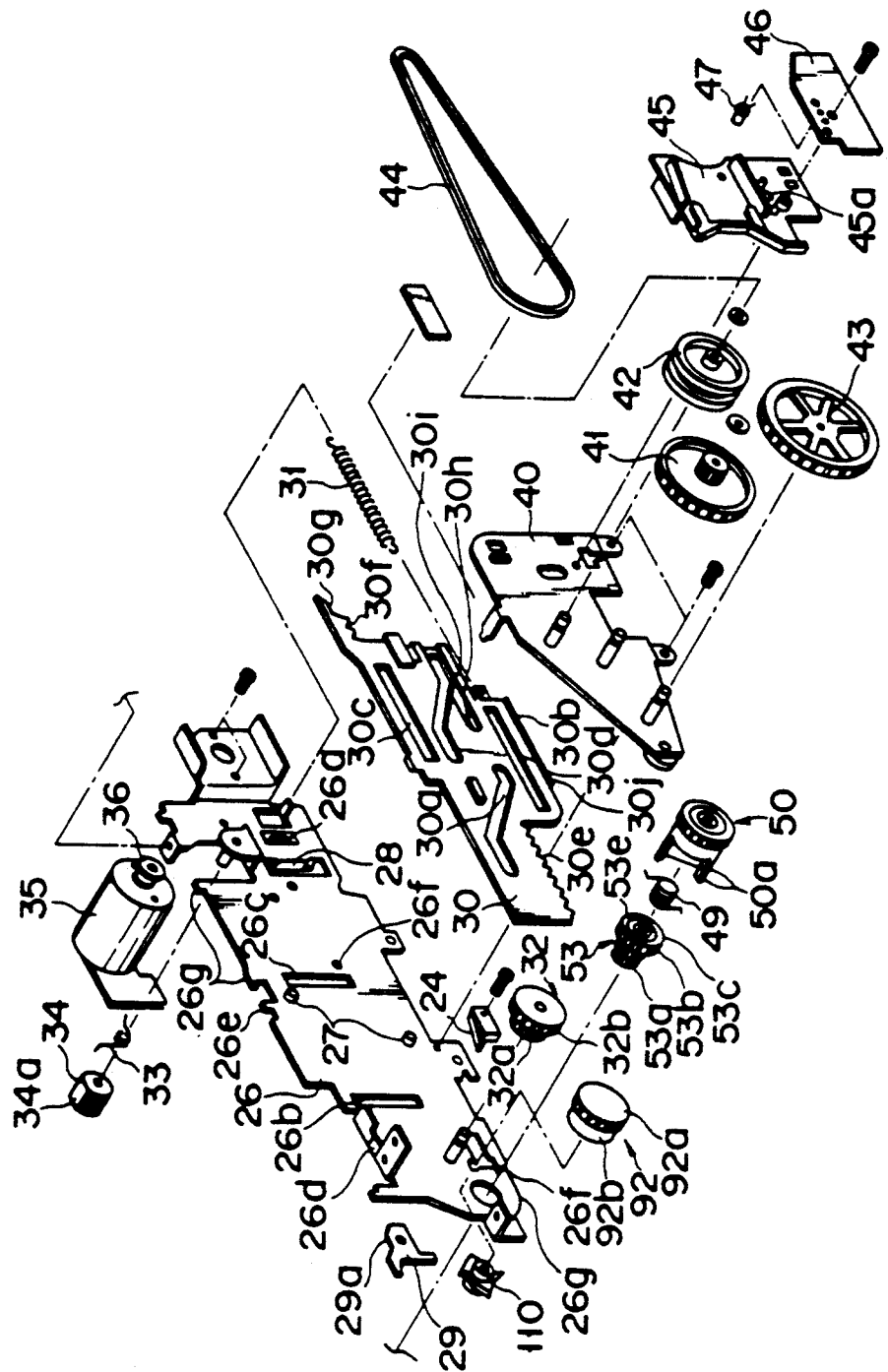

A tray section which is partitioned by FIGS. 6A–6D, as shown in FIG. 6, will be described. The tray assembly 59 includes main components comprising a tray frame 60, a tray plate 61, pop-up sliders 62, 66, pop-up slider springs 64, 68, a pair of right and left pop-up levers 70, a pair of right and left pop-up lever springs 71, a cassette lid lock lever 72, a lock release lever spring 73, click levers 74, 78, click lever springs 75, 79, tray rails 76, 80, a cassette stopper 82 and a cassette stopper spring 83.

The tray plate 61 is fixed to the tray frame 60 by screws to form the tray assembly 59 which serves as a cassette holder section. A part 61a is erected upward from the center rear of the tray plate 60 to prevent the cassette 200 from being inserted upside down and front side rear into the cabinet through the slot. In addition, the tray plate 61 includes upward-erected parts 61b which serve as stoppers for preventing the cassette 200 from moving in forward and backward directions of the tray assembly 59 when the cassette 200 is placed in the tray assembly 59. Further, the tray plate 61 includes plural through-holes 61c which prevent the tray plate 61 itself from being contacted with the tape drive system or section when the tray assembly 59 is set at its set position in the cabinet of the VTR set. Each of the through-holes 61c has such an area that allows a hand or fingers to pass through it when the tray assembly 59 is projected from the front or slot side of the cabinet at the projected position, and it extends to the front side of the tray frame 60 projected from the front side of the cabinet. This shape of each of the through-holes 61c is intended to protect the operator safe in such a way that the operator's hand or fingers can be caught not between the cabinet and the thin end face of the tray plate 61 but between the cabinet and the wide front end of the tray frame 60 so as not to be hurt. When force per unit area of the through-hole 61c is reduced to a great extent, the danger of hurting the operator's hand or fingers can be greatly reduced.

Each of the through-holes 61c is tapered at its front portion at an angle which is about 45° or less relative to the direction in which the tray assembly 59 is moved forward and backward. This is because the danger that the operator's hand or fingers are caught between the thin end face of the tapered portion of the through-hole 61c and the cabinet 210 to be hurt becomes higher as the angle of the tapered portion is made larger. The through-hole 61c is not divided plural but it may be formed single to shape the tray plate 61 like a channel as shown in FIG. 7. When it is formed single in this manner, it can satisfy the above-mentioned safety for the operator and prevent wrong matters except the right cassette from being placed in the tray assembly 59 because the wrong matters such as the VHS-C cassette are dropped from the tray assembly 59 passing through the single through-hole 61c.

The tray frame 60 is provided with rack gear sections 60a and 60b and it is horizontally moved by tray drive gears 52 and 53 which will be described later. Tray rails 76 and 80 are fixed to the right and left of the tray frame 60 by screws, and the horizontal movement of the tray frame 60 is guided by grooves 60c, 60d (see FIG. 7) and 76a, 80a (see FIG. 6C) formed on these tray frame 60 and tray rails 76, 80. Guide rollers 4 (shown in FIG. 14) planted on each of side plates of a lifter 2 in a tray lifter assembly 1 which will be described later are engaged with the grooves 76a and 80a of the tray rails 76 and 80.

Each of the guide rollers 4 is made of conductive material common to that of which the tray rails 76, 80 and the tray lifter assembly 1 are 80a is made wider in the vertical direction so as to make it easy to receive the guide roller 4 therein. On the other hand, the grooves 60c and 60d are engaged with door lock levers 86 and 87 which will be described later so as to horizontally guide the tray assembly 59 and to control the operation of each of the door lock levers 86 and 87. The open end of each of the grooves 60c and 60d is tapered in vertical and horizontal directions to made it easy for the door lock lever to be engaged with the groove, thereby enabling the door lock lever to be operated with high reliability.

As shown in FIG. 7, the tray frame 60 is made so low in height at the front side thereof as to see a part of the cassette 200 when the cassette 200 is placed in the tray frame 60, and is lower in height at the center portion of the front side thereof than at those right and left of the center portion. Further, each of the right and left side walls of the tray frame 60 is provided with a slope 60m extending outward from bottom to top so as to make it easy for the cassette 200 to be attached to and detached from the tray frame 60. It is also provided at its rear end with a step 60e projected so high as to make a clearance relative to the top of the slot through which the tray assembly 59 is inserted into and ejected from the cabinet, and to almost hide the cassette 200 in the tray frame 60. Each of the projected steps 60e is provided with a slope 60n tilted in such a direction that causes the step 60e to become smaller in width from bottom to top, and also with another slope 60p tilted in such a direction that causes the step 60e to become smaller in width from front to rear, thereby making it easy for the cassette 200 to be attached to and ejected from the tray frame 60. These slopes 60n and 60p serve to achieve the effect of preventing the cassette 200 from being struck against the rim of the top of the cabinet 210 not to damage the cabinet 210 but guide the cassette 200 to its right position in the cabinet 210 before it hits the cabinet 210 when it is to be set in the cabinet 210. Top edges of the right and left portions at the front side of the tray frame 60 are formed like a curve having a certain radius, paying attention to the safety of the operator not to hurt him by the edges.

Figure 8:
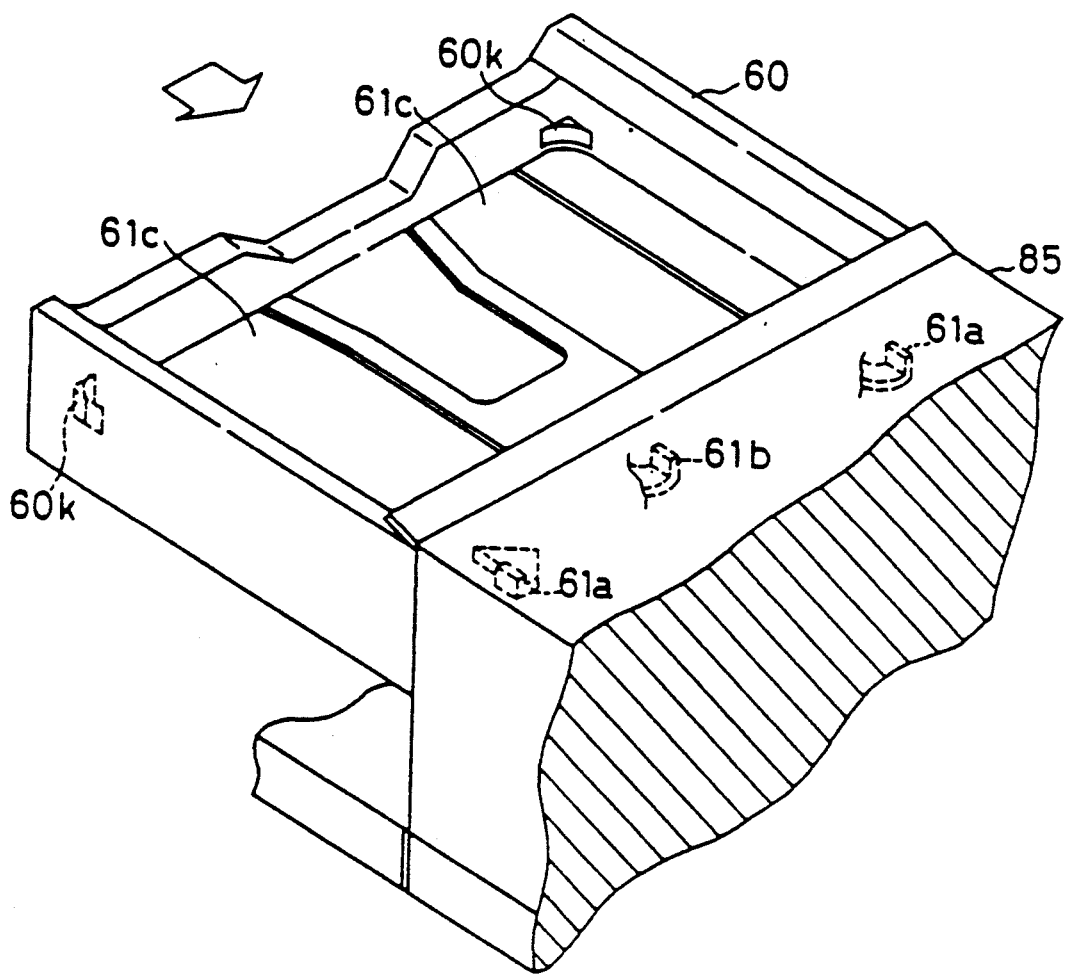
FIG. 8 is a perspective view showing a part of the tray assembly in detail.

Each of inner corners at the front side of the tray frame 60 is provided with a curve 60k shaped substantially same as each of outer corners at the one (or rear) side of the cassette 200, having same radius as that of the outer corner at the rear side of the cassette 200, as shown in FIG. 8. These curves 60k serve to prevent the cassette 200 from being set front side rear in the tray frame 60 and when the cassette 200 should be set front side rear in the tray frame 60, those outer corners of the cassette 200 which are not curved to have the above-mentioned radius are struck against the curves 60k of the tray frame 60 to prevent the cassette 200 from being set front side rear in the tray frame 60. Although other various measures are added to prevent the cassette 200 from being set front side rear in the tray frame 60, these curves 60k made it more reliable to prevent the cassette 200 from being set front side rear.

Figure 9:
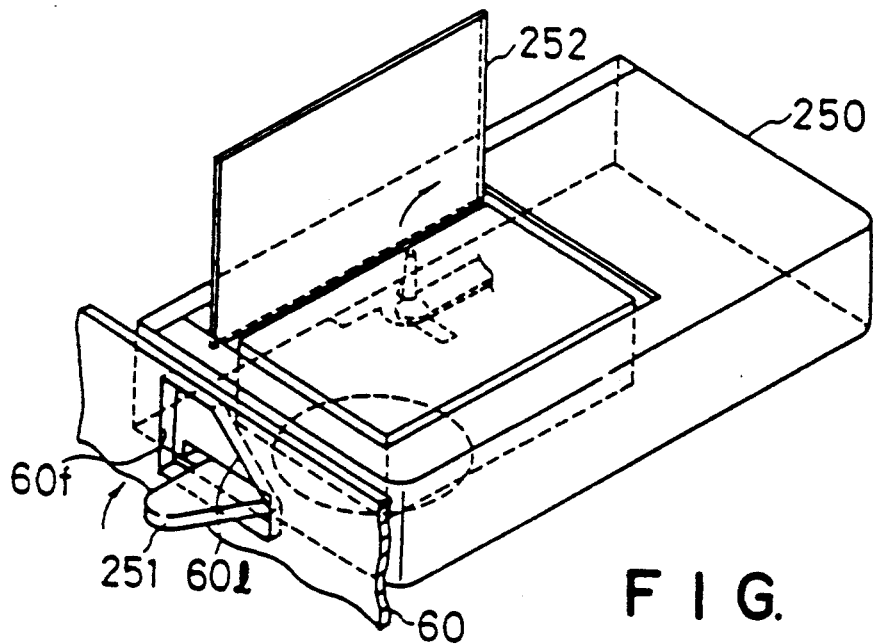
FIG. 9 is a perspective view showing how a C cassette adapter is located relative to a tray frame.
Figure 10:
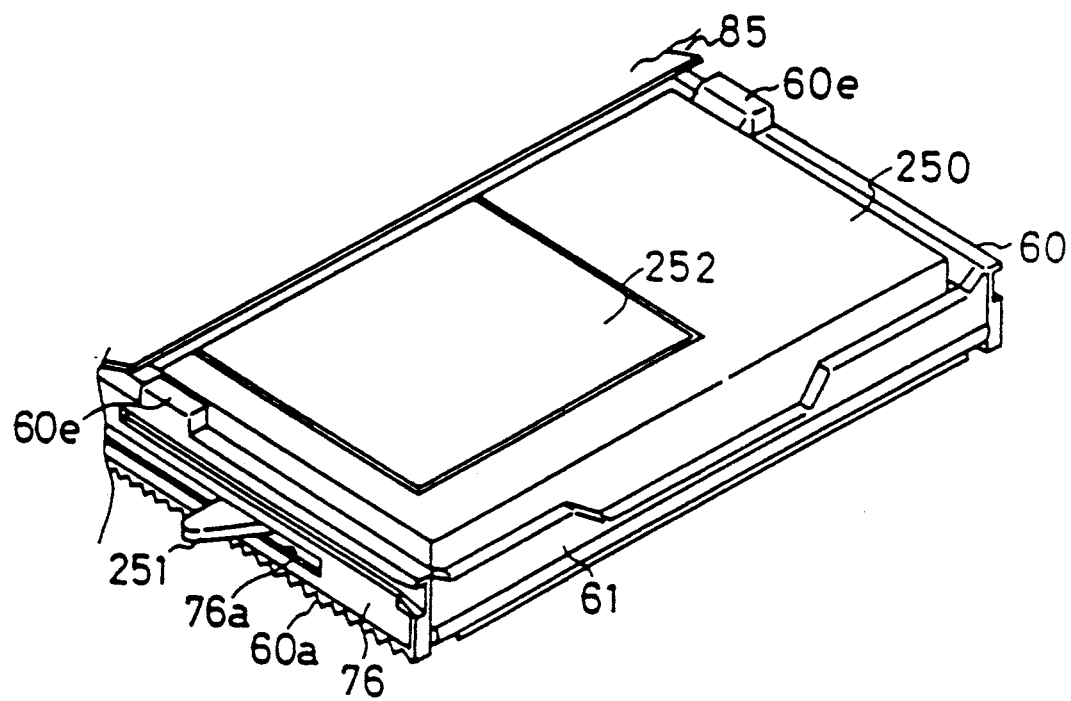
FIG. 10 is a perspective view showing the C cassette adapter set in the tray assembly.

The left side of the tray frame 60 has a through-hole 60f, as shown in FIG. 9. This through-hole 60f is intended to receive a detecting lever 251 of a C cassette adapter 250 for the well-known VHS-C cassettes which detects whether or not the C cassette is loaded. The through hole 60f has substantially the same height as that of the groove 60c so as not to spoil the appearance of the cassette assembly 59. If the C cassette adapter 250, with a C cassette not loaded in it, should be brought into the slot-in state, the detecting lever 251 would project outside through the groove 76a of the tray rail 76, as shown in FIG. 10. The detecting lever 251 thus projected is stopped by the guide roller 4 of the tray lifter assembly 1 on the way of bringing the adapter 250 into the slot-in state. A control section 300 (see FIG. 11) which will be described later therefore detects abnormality to eject the adapter 250 outside, thereby preventing the C cassette adapter 250 and parts of the VTR set from being damaged.

The hole 60f of the tray frame 60 has a slope 601 erecting from the front side of the tray frame 60 in the slot-in direction to guide the detecting lever 251. This slope 601 enables the detecting lever 251, which detects whether or not the C cassette is loaded, to be housed into the C cassette adapter 250 and the C cassette adapter 250 which has housed the detecting lever 251 in this manner to be picked up out of the tray frame 60 when the C cassette adapter 250 in which the C cassette is not loaded is wrongly brought into the slot-instate but ejected out of the cabinet and popped up out of the tray frame 60 as will be described later.

The tray frame 60 is provided at rear ends of its right and left sides with through-holes 60g and 60h through which light is passed to detect the end of a tape in the cassette (see FIG. 6A). These through-holes 60g and 60h are balanced in height with the lower grooves 76a and 80a of the tray frame 60 so as not to spoil the appearance of the tray assembly 59.

The tray rails 76 and 80, fixed to the tray frame 60 by screws, have at lower ends thereof rack gear sections from which the rack gear sections 60a and 60b which are made continuous. Click levers 74 and 78 are freely swingably held between the tray frame 60 and the tray rail 76 and between the tray frame 60 and the tray rail 80, respectively. These click levers 74 and 78 are urged by the click lever springs 75 and 79 in such a direction that the lower grooves 76a and 80a of the tray frame 60 are made narrower. As the result, they are engaged with the guide rollers 4 of the tray lifter assembly 1 to hold the position of the tray assembly 59 relative to the tray lifter assembly 1 when the horizontal movement of the tray assembly 59 in the slot-in direction is finished. They are engaged with the guide rollers 4 at a certain angle, so that they can pull and hold the tray assembly 59 even when the tray assembly 59 is shifted from its true position in a certain range.

Controls 77 and 81 for controlling positions of the tray rails 76 and 80 are formed at rear portions of the tray rails 76 and 80 and engaged with rear side chassis tray controls 12 and 28, which will be described later, when the tray assembly 59 finishes its horizontal movement in the slot-in direction and then starts its vertical movement. When the tray assembly 59 is separated from the click levers 74 and 78 by unexpected external force added although it is basically held by them, the extent to which it is separated from them can be thus controlled and when the external force is eliminated, it can be pulled and held by the click levers 74 and 78, as described above.

That portion of each of the rear side chassis tray controls 12 and 28 which begins to engage the tray rail position control 77 or 81 is curved to guide the tray rails position control 77 or 81 and the tray rail position controls 77 and 81 can be pulled in by these curved portions of the rear side chassis tray controls 12 and 28 even when the tray assembly 59 is not sufficiently moved in the horizontal or slot-in direction before it starts its vertical movement. Its position can be therefore held with high accuracy when it is placed at its set position in the cabinet. Particularly when it is projected or ejected out of the cabinet, shaft gears 18 and 34 which serve to change over its movement and which will be described later can be toothed with rack gear sections 76b and 80b on rear tops of the tray rails 76 and 80 without being shifted in phase, to thereby make its movement stable.

When the tray assembly 59 is projected out of the cabinet as shown in FIG. 12, the tray rail position controls 77 and 81 ride over tops 13a and 29a of front side chassis tray position controls 13 and 29 attached to side chassis 10 and 26. The tray assembly 59 is thus urged in a direction into the clearance between the groove 60c, the guide rollers 4, the door lock lever 86 and the other groove 60d, the other guide rollers, the other door lock lever 87 to thereby reduce the play of the tray assembly 59 in the vertical direction. The play of the tray assembly 59 in the right and left direction can be reduced by guiding the tray assembly 59 by the tray lifter 2, inner faces of the front side chassis tray controls 13, 29, and a pair of area reducing sections 10a, 26a at rear inner faces of the side chassis 10 and 26, so that the tray assembly 59 can be guaranteed its smooth movement (see FIG. 13).

When the tray assembly 59 is at its projected position, its right and left play is reduced by urging it in a direction while using the elasticity of a tray detecting lever 89 which will be described later. More specifically, the paired guide rollers 4 located on the front side of the tray frame 60 are guided into the shifted-up grooves 60c and 60d and the rear side portion of the tray assembly 59 is temporarily lifted before the rack gear sections 76b and 80b of the tray rails 76 and 80 are toothed with the shift gears 18 and 34 (see FIG. 14A). The tray rails 76 and 80 thus correct postures of the shift gears 18 and 34 while defining flat portions 18a and 34a of the shift gears 18 and 34 which are toothed with rack gear sections 14f and 30f of rack sliders 14 and 40 by rear flat portions of the gear sections 76b and 80b (see FIGS. 15A, 15B and 15C). The shift gears 18 and 34 are then toothed with the rack gear sections 76b and 80b of the tray rails 76 and 80 and the rack sliders 14 and 30 are made operative (see FIG. 15D). The tray assembly 59 is thus lowered.

Figure 16:
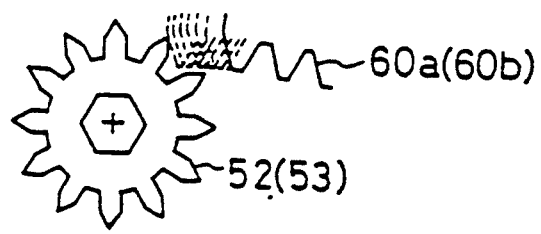
FIG. 16 is a side view showing the relation of the tray assembly relative to tray drive gears.

When the tray assembly 59 is at its projected position, the lower rack gear sections 60a and 60b of the tray frame 60 are temporarily guided in a direction reverse and parallel to their moving direction, as shown in FIG. 16, to thereby absorb their backlash. This prevents gear play or untoothing which is likely to be caused at the time when the rack gear sections 60a and 60b start their toothing with small gear sections 52a and 53a of the tray drive gears 52 and 53.

Figure 17:
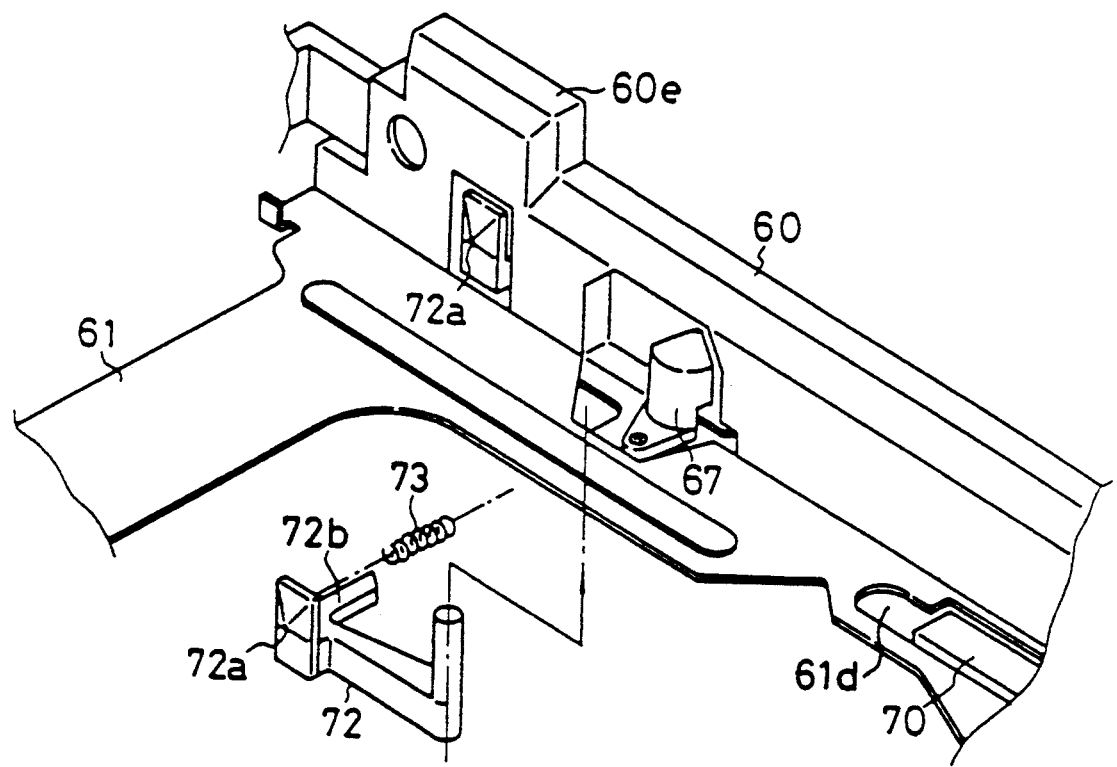
FIG. 17 is a perspective view showing a system for preventing a wrong cassette from being inserted into the cabinet.

The cassette lid lock releasing lever 72 is located in the tray frame at the right rear side of the tray assembly 59 in such a way that it is pivoted upon the tray frame 60 and the tray plate 61. It includes a lid lock releasing section 72a and a boss section 72b and it is freely swingable right and left and urged inward toward the tray assembly 59 by the release lever spring 73 (see FIG. 17). When the cassette 200 is housed in the tray assembly 59, therefore, the cassette lid lock releasing lever 72 releases lid lock by pushing a lid lock releasing button 202 of the cassette 200. The lid lock releasing section 72a of the cassette lid lock releasing lever 72 is tapered from inside to outside so that the cassette 200 can be smoothly attached to and detached from the tray assembly 59. The cassette lid lock releasing lever 72 arranged in the tray assembly 59 in the above-described manner forms quite a simple system, making it unnecessary to conduct a specific operation for releasing the lid lock. Further, when the lid lock releasing section 72a of the cassette lid lock releasing lever 72 is urged outward to such an extent that causes the section 72a to be almost contacted with the inner face of the tray frame 60, the boss section 72b of the lever 72 is projected into the groove 60d of the tray frame 60 (see FIG. 18B). This enables the cassette inserted upside down to be detected.

When the cassette is placed upside down in the tray assembly 59, the lid lock releasing section 72a of the cassette lid lock releasing lever 72 is pushed by one side of a half of the cassette to almost touch the inner face of the tray frame 60 so that the boss section 72b of the cassette lid lock releasing lever 72 can be projected into the right lower groove 60d of the tray frame 60. As the result, the boss section 72b is stopped by the guide roller 4 of the tray lifter 2 on the way of bringing the tray assembly 59 into the slot-in state, thereby making it impossible for the tray assembly 59 to be further moved into the slot-in state. This is detected by the control section 300 (see FIG. 11), which discharges the tray assembly 59 responsive to the detection of abnormality. When the cassette is normally placed in the tray assembly 59, the lid lock releasing section 72a of the cassette lid lock releasing lever 72 is engaged with a lid lock releasing section of the cassette not to conduct its swinging movement and the boss section 72b is thus positioned inside the groove 60d of the tray frame 60 to allow the tray assembly 59 to be further moved (see FIG. 18A).

The tray plate 61 is fixed from below to the tray frame 60 of screws. The tray plate 61 is made by a conductive metal plate to ground the electrification of the cassette half.

Figure 19:
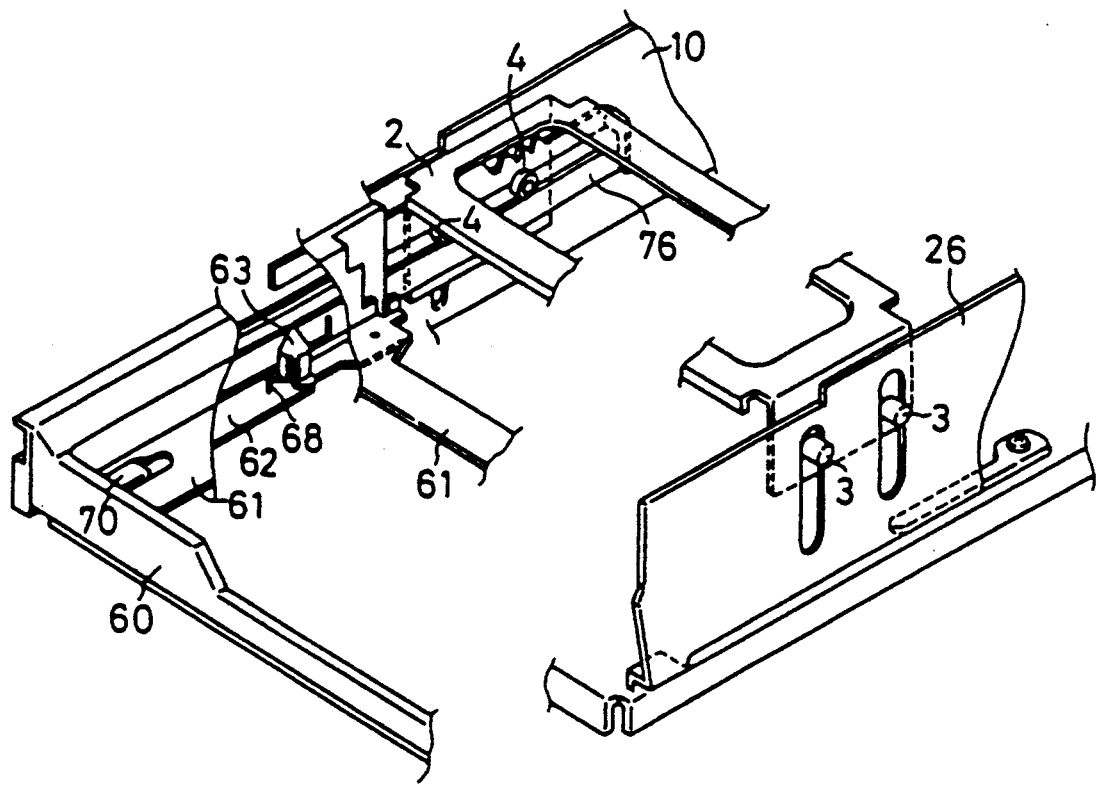
FIG. 19 is a perspective view showing a pop-up system.
Figure 20:
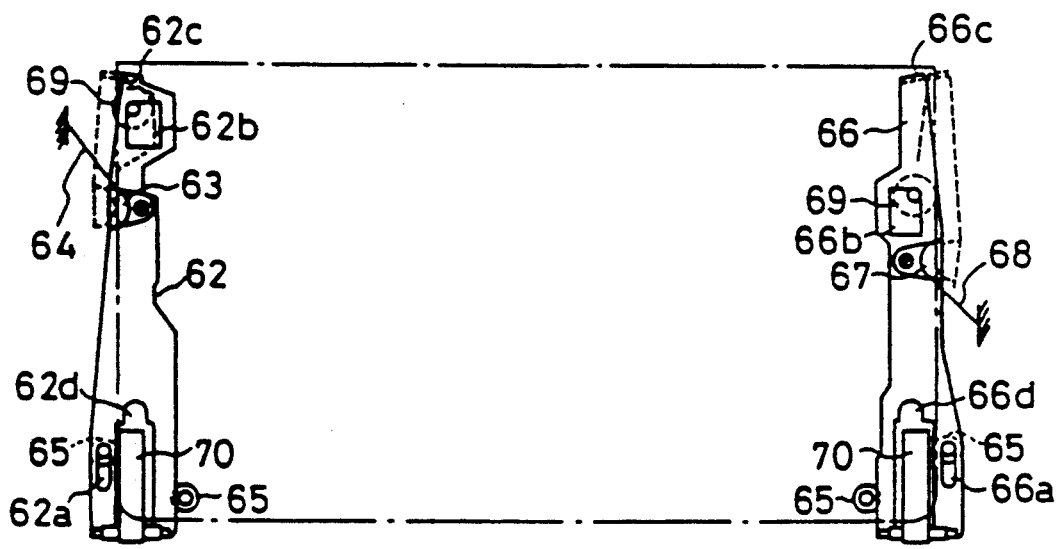
FIG. 20 is a plan showing the pop-up system.

A selective pop-up system is arranged at the underside of the tray plate 61 or in the tray frame 60 so as not to spoil the appearance of the tray assembly 59 when viewed from above (see FIGS. 19 and 20). More specifically, the paired pop-up sliders 62 and 66 having a certain interval between them are arranged at the underside of the tray plate 61. Spacer sleeves 65 are fixed to outer faces of the right and left front sides of the tray plate 61 by screws and engaged with slits 62a and 66a of the pop-up sliders 62 and 66 to define the movement of the pop-up sliders 62 and 66 in right, left, upward and downward directions but to allow them to freely slide in the forward and backward direction. The spacer sleeve 65, screw-fixed to the tray plate 61, serves to limit the movement of inner ends of the pop-up sliders 62 and 66 in the upward and downward direction.

Further, spacer sleeves 69 are fixed to the right and left rear sides of the tray plate 61 by screws and engaged with rectangular holes 62b and 66b of the pop-up sliders 62 and 66 to limit the movement of the pop-up sliders 62 and 66 in the upward and downward direction. Clearances between the pop-up slider 62 and the rectangular hole 62a and between the pop-up slider 66 and the rectangular hole 66a allow the pop-up sliders 62 and 66 to be swung right and left arround the spacer sliders 65 located at the front of the right and left sides of the tray plate 61. Cassette detecting bosses 63 and 67 are attached to the pop-up sliders 62 and 66, passing through escape holes of the tray plate 61. When urged outward, the cassette detecting bosses 63 and 67 are housed in housing areas formed at the right and left portions of the tray frame 60. The pop-up sliders 62 and 66 are urged inward by the pop-up slider springs 64 and 68. When the cassette 200 is placed in the tray assembly 59, the pop-up sliders 62 and 66 are moved outward against the pop-up slider springs 64 and 68 at the right and left sides of the cassette half.

The pop-up sliders 62 and 66 are conductive, contacting the tray plate 61, the tray rail 76 and the tray plate 61, the tray rail 80, respectively. Static electricity electrified to the cassette 200 can be thus ground, as described above, through the cassette half, pop-up slider springs 64, 68, tray rails 76, 80, guide rollers 4, a tray lifter 2, a tray lifter operating section 3, side chassis 10, 26 and a main chassis.

A pair of openings 61d are formed at front portions of the right and left sides of the tray plate 61 and the paired pop-up levers 70 are arranged in these openings 61d. The pop-up levers 70 are freely swingably supported by shafts 70b at the front of the tray frame 60. The pop-up levers 70 are housed in pop-up lever housing openings 62d and 66d of the pop-up sliders 62 and 66 with their front ends urged downward and positioned a little higher than the top of the tray plate 61 by the pop-up lever springs 71. When the cassette 200 is set in the tray assembly 59, therefore, it is struck against the pop-up levers 70 before it is struck against the tray plate 61, thereby reducing the sound of its setting impact due to the cushion effect of the pop-up levers 70. The pop-up levers 70 are housed in the pop-up lever housing openings 62d and 66d of the tray plate 61, positioning in the tray plate 61 at a level a little higher than the tray plate 61. This enables the tray assembly 59 to be made smaller in thickness.

Each of the pop-up levers 70 has a curved portion 70a at its front end and these curved portions 70a of the pop-up levers 70 are engaged with the pop-up sliders 62 and 66. When the pop-up sliders 62 and 66 are slid rearward, therefore, the front ends of the pop-up levers 70 are lifted. When they are returned forward, the front ends of the pop-up levers 70 are lowered to their original positions.

The pop-up sliders 62 and 66 have curved portions 62c and 66c at their rear ends. When the tray assembly 59 in which the cassette 200 has been set is projected out of the cabinet, the curved portions 62c and 66c of the pop-up sliders 62 and 66 are urged outward by the cassette 200, as described above. The curved portions 62c and 66c are therefore engaged with pop-up control levers 57 which will be described later on the way of bringing the tray assembly 59 into the projected position. The pop-up sliders 62 and 66 are thus slid rearward in relation to the tray assembly 59 to drive the pop-up levers 70 so as to lift the front side of the cassette 200. The front side of the cassette 200 is therefore lifted when the tray assembly 59 is at its projected position, thereby making it easy to pick up the cassette 200 (see FIG. 21).

When the tray assembly 59 is projected out of the cabinet without any cassette housed therein, the pop-up sliders 62 and 66 are urged inward by the pop-up slider springs 64 and 68 to thereby allow their curved portions 62c and 66c to escape inward from the pop-up control levers 57. The tray assembly 59 is therefore projected out of the cabinet while keeping the front ends of the pop-up levers 70 lowered, so that the cassette 200 can be smoothly placed in the tray assembly 59. When the cassette 200 which has been lifted at its front side under the state that the tray assembly 59 is at the projected position is picked up out of the tray assembly 59, the pop-up sliders 62 and 66 are urged inward by the pop-up slider springs 64 and 68 to allow their curved portions 62c and 66c to escape inward from the pop-up control levers 70, which are thus returned to their original positions by the pop-up lever springs 71, thereby causing the pop-up sliders 62 and 66 to be returned forward.

The cassette detecting bosses 63 and 67 which are shifted from each other in the forward and backward direction by a certain distance are freely swingably attached to the pop-up sliders 62 and 66. When the cassette 200 is set in the tray assembly 59, the cassette detecting bosses 63 and 67 are pushed outward at different timings to disperse force caused by the cassette 200 which is being set into the tray assembly 59. This enables the cassette 200 to be smoothly set in the tray assembly 59. The cassette detecting bosses 63 and 67 are shifted from each other in the forward and rearward direction by the certain distance. Even when the operator should fail to pick up the cassette 200 out of the tray assembly 59, therefore, at least one of the paired pop-up levers 70 is kept lifted at its front end and the cassette 20 is thus still kept so popped up at its front side as to make it easy for the operator to pick up the cassette 200 out of the tray assembly 59.

The pop-up sliders 62 and 66 may be arranged so that their curved fronts 62c and 66c are engaged with inner faces of the pop-up control levers 57, even when no cassette is in the tray assembly 59, by defining clearances between the rectangular hole 62b and the larger space sleeve 69 and between the rectangular hole 66b and the other larger space sleeve 69. The front ends of the pop-up levers 70 are lifted in this case under the state that the tray assembly 59 is at its projected position, but when the cassette 200 is placed and pushed into the tray assembly 59, the pop-up levers 70, the pop-up sliders 62, 66 and the pop-up control levers 57 are reversed to allow the tray assembly 59 to be brought into its slot-in position, as described above.

Although the pop-up system which is made operative to achieve a series of the above-described functions has been described on the assumption that each of the components is used as a pair, every component may be used as a single.

The pop-up sliders 62 and 66 are urged inward by the pop-up slider springs 64 and 68, as described above. When the cassette 200 is set at the tape drive section in the tray assembly 59 under the state that the tray assembly 59 is at its set position in the cabinet, therefore, the pop-up sliders 62 and 66 add the urging force of the pop-up slider springs 64 and 68 to their cassette detecting bosses 63 and 67 to hold the cassette 200 between them. As a result, the vibration of the cassette 200 can be reduced to eliminate wow flutter, jitter and noises. The ability of setting the cassette in the cabinet can be improved accordingly.

A display member 91 which is called "popped-up demo card" is housed in the tray assembly 59, as shown in FIG. 22, when VTR sets, for example, are carried as products out of the factory. This display member 91 contains words which explain how to work the VTR set and it is folded along its center line to form upper and lower halves. Its folded line is located on the front side of the tray assembly 59 and it is urged to close its upper half onto its lower half (as shown by two-dot and dash line in FIG. 21). The lower half of this display member 91 has holes (not shown) through which the pop-up levers are escaped when they are made operative. The lower half of the display member 91 is shaped substantially same as the bottom of the cassette 200 and pushed into the tray assembly 59. The upper half thereof is made so a little smaller in size so as to be popped up without contacting the tray assembly 59 when the tray assembly 59 is projected out of the cabinet, and it contains words such as various designed letters and illustrations, as described above, to explain how to work the VTR set. When the tray assembly 59 is projected out of the cabinet by the above-described selective pop-up system, therefore, the upper half of the display member 91 is unfolded upward by the pop-up levers 70 to bring the designed letters and illustrations on it into eyes of those who have some interest in the VTR set, for example.

Figure 23:
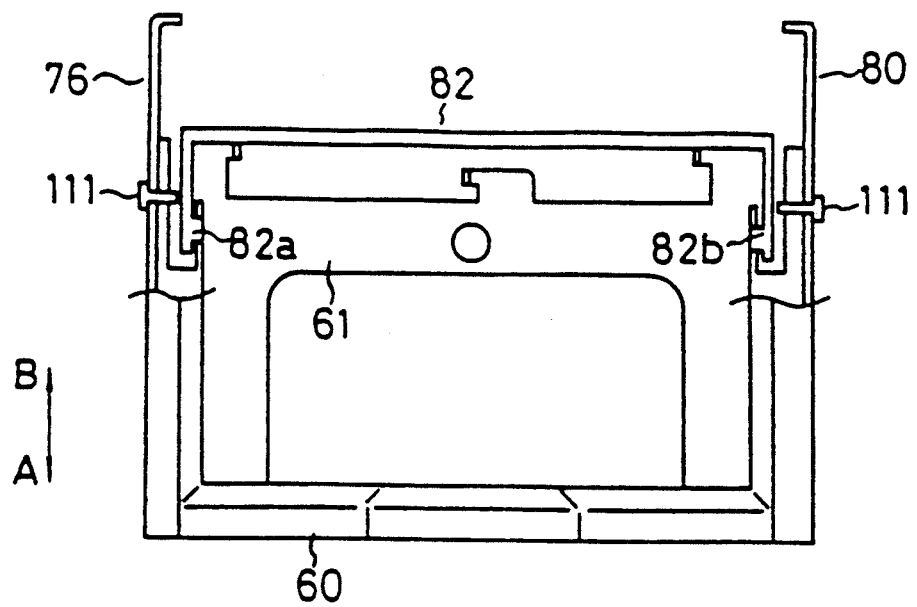
FIG. 23 is a plan showing a cassette stopper of the tray assembly.

The cassette stopper 82 which also serves as a blind is pivoted on the rear side of the tray frame 60 to be freely swingable in the vertical direction (see FIG. 23). Shafts 82a and 82b which serve as fulcrums for the cassette stopper 82 are made integral to the cassette stopper 82 and inserted into fulcrum holes 60i and 60j of the tray frame 60, using their elasticity. When the tray rails 76 and 80 are fixed to the tray frame 60 by screws 111, as shown in FIG. 23, the extent to which the shafts 82a and 82b come out of the fulcrum holes 60i and 60j is limited by the screws 111, thereby keeping the shafts 82a and 82b held in the holes 60i and 60j. The cassette stopper 82 is urged in its closing direction by the cassette stopper springs 83 and it is opened, associating with the slot-in process of the tray assembly 59, together with a lid 201 of the cassette 200 by a cassette lid opener 38 attached to a rear reinforcing plate 37 which will be described later.

Figure 25:
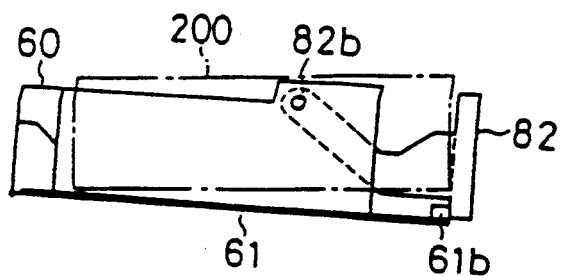
FIG. 25 is a side view showing the cassette stopper operated.

The fulcrum arround which the cassette stopper 82 is swung is set at a same position in the vertical, forward and rearward directions as that of the lid 201 of the cassette 200 and the cassette stopper 82 is swung together with the lid 201 of the cassette 200 which has been set in the tray assembly 59. The cassette stopper 82 is provided with a window 82c (see FIG. 6B) through which a tape running or driving member 350 at the tap drive section can be viewed from above when the cassette stopper 82 is opened with the tray assembly 59 set at the set position. The rear reinforcing plate 37 is also provided with a similar hole so that examination and test for adjusting the running of the tape, for example, at the tape drive section can be conducted without any hindrance when the tray assembly 59 is assembled. The cassette stopper 82 also serves to blind the tape drive section to prevent fingers or the like of the user from entering into the tape drive section when the tray assembly 59 is at its projected position. Further, the cassette stopper 82 also serves as a final stopper for the cassette 200 when the cassette 200 is placed in the tray assembly 59, mounting on the erected portions 61b, as shown in FIG. 25, said erected portions 61b being arranged at rear right and left sides of the tray frame 60 to serve as stoppers for the cassette 200 in the forward and rearward direction.

An operation system will be described. The operation system includes the tray lifter assembly 1 for moving the tray assembly 59 up and down, side chassis assemblies 9, 25, the rear reinforcing plate 37 for combining and holding the side chassis assemblies 9, 25, a front reinforcing plate 85, a front lower reinforcing plate 55, a tray drive assembly 39 for decelarating and transmitting a drive motor 35, and a drive transmitting section for synchronously transmitting drive force transmitted by the tray drive assembly 39 to the side chassis assemblies 9, 25.

The tray lifter assembly 1 form a lifter system comprising the lifter 2, guide rollers 4, plate springs 5 for holding the cassette, hold rollers 6, roller shafts 7 and cassette detecting switches 8. Four guide rollers 4 are freely rotatably supported by the lifter 2 at the front and rear thereof and engaged with the grooves 76a and 80a of the tray assembly 59, as described above, to define the position of the tray lifter assembly 59 in the right and left direction, guide it in the forward and rearward direction and hold it in the up and down direction. The lifter 2 is provided with four lifter operating pins 3, two at the right side thereof and the other two at the left side thereof. These pins 3 are engaged with lift grooves 14a, 14b and 30a, 30b of the rack sliders 14 and 30, passing through guide slits 10b, 10c and 26c, 26d of the side chassis 10 and 26 which will be described later. The guide slits 10b, 10c and 26b, 26c of the side chassis 10 and 26 guide the lifter operating pins 3 up and down. The lift grooves 14a, 14b and 30a, 30b of the rack sliders 14 and 30 guide the lifter operating pins 3 up and down, as will be described later. While limiting the position of the tray lifter assembly 1 in the forward and rearward direction, therefore, the rack sliders 14 and 30 are guided forward to an upper position and rearward to a lower position.

Those of the guide slits 10b, 10c and 26b, 26c of the side chassis 10 and 26 which are located at the front are made to have a smaller clearance relative to their corresponding lifter operating pins 3 while the others thereof which are located at the rear are made to have a larger clearance relative to their corresponding lifter operating pins 3. This is intended to absorb any irregularity of parts made and hold the accuracy of limiting the position of the tray lifter assembly 1 in the forward and rearward direction.

The lifter 2 is provided with two large holes 2a and 2b. These holes 2a and 2b are used to observe torque at the time when the VTR set is adjusted, and they enable various examinations to be conducted while holding the cassette setting device in the VTR. The circumferential rim of each of them is reinforced by bending and drawing processes to enable the plate spring 5 to be held.

Figure 26:
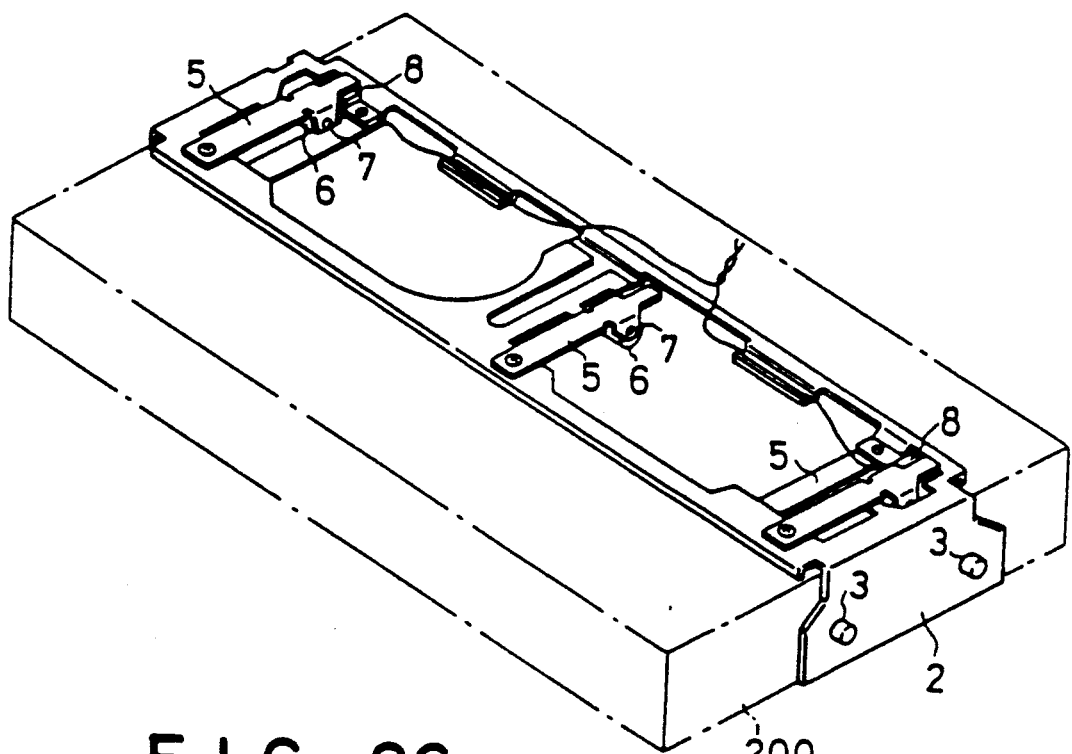
FIG. 26 is a perspective view showing a lifter.

Three hold rollers 6 are attached to the lifter 2 at a certain interval, as shown in FIG. 26. The hold rollers are freely rotatably supported by the plate springs 5 through the roller shafts 7 and screw-fixed to the tray lifter assembly 1 at three positions, center, right and left of the top of the tray lifter assembly 1, to form a cassette holder section. The plate springs 5 are fixed to the lifter 2 to have some flexibility and when the cassette 200 is placed in the tray assembly 59 to be brought into the slot-in state, the plate springs 5 are made more flexible to such an extent as to press and hold the cassette 200. The hold rollers 6 serves to make cassette insertion into the tray assembly 59 smooth and prevent the top of the cassette 200 from being damaged by its sliding.

When the cassette 200 is inserted into the tray assembly 59 with a lid 252 of the C cassette adapter 250 opened (see FIG. 9), the cassette holder section also serves to close the lid 252. Two of the hold rollers 6 are positioned at right and left sides of the lifter 2 but the remaining one thereof is located on the center line of the lifter 2, shifting from the other two in the forward and rearward direction. The hold rollers 6 therefore press the top of the cassette 200 at three points, thereby enabling the cassette 200 to be held with a higher stability. In addition, the positioning of one hold roller at the center of the top of the cassette 200 and the effect of pressing the top of the cassette 200 at three points by the hold rollers 6 improve the setting capacity of the tray assembly 59, reducing wow flutter, jitter and noises.

Further, when the one of the hold rollers 6 which is located at the center of the top of the cassette 200 is made of elastic material such as rubber or of vibration-eliminating material, or when the cassette holder section at the center of the top of the cassette is made to be of vibration-eliminating structure, the setting capacity of the tray assembly 59 can be further enhanced.

The setting capacity of the tray assembly 59 is also improved in that the cassette 200 is sandwiched between and pressed by the cassette detecting bosses 63 and 67 to hold it in right and left and up and down directions.

Figure 27A:
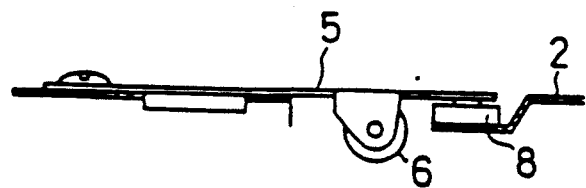
FIGS. 27A and 27B are side views showing how the cassette stopper is operated.
Figure 27B:
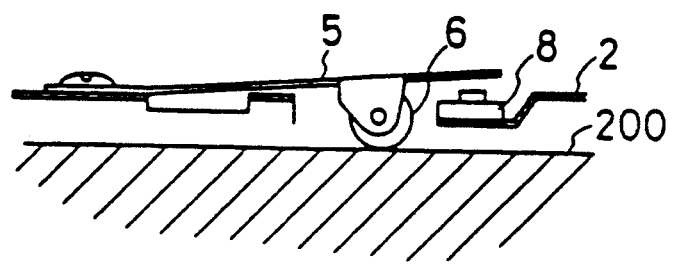

Two cassette detecting switches 8 are sandwiched between the lifter 2 and the plate springs 5 at rear right and left of the top of the tray lifter assembly 1. As shown in FIG. 27A, each of the cassette detecting switches 8 is made operative by the plate spring 5. They are usually kept on-state by the plate springs 5 and when the cassette 200 is present in the tray assembly 59, the plate springs 5 are flexed to bring the cassette detecting switches 8 into off-state (see FIG. 27B).

Figure 28:
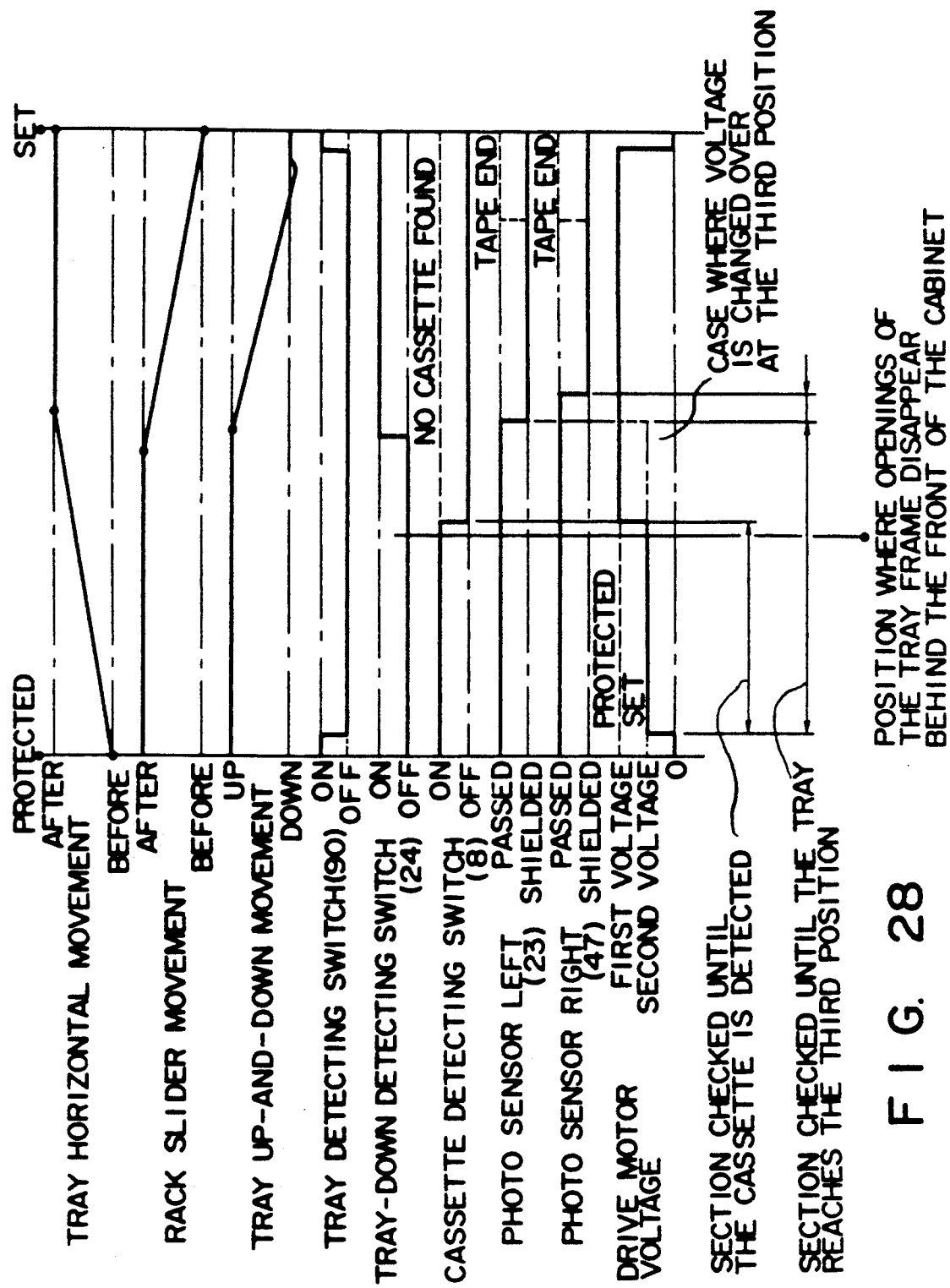
FIG. 28 is a timing chart showing operating timings of the control system in FIG. 11.

The two cassette detecting switches 8 are connected parallel to the control section 300, as shown in FIG. 11, and when the tray assembly 59 is placed at its slot-in state and both of the cassette detecting switches 8 are kept off-state, the control section 300 finds that the cassette 200 is present in the tray assembly 59, so that the tray assembly 59 can be driven to its set position, as will be described later. When one or both of the cassette detecting switches are kept on-state in this case, the tray assembly 59 is stopped at a third position between its projected position and its set position. Plate springs 5, hold rollers 6 and cassette detecting switches 8 are positioned in such a way that cassette detection can be carried out until the tray assembly 59 reaches its third stop position or at such a timing as shown in FIG. 28. This makes it unnecessary to conduct specific drive control to stop the tray assembly 59 at the third position. This third stop position is set in the cabinet, just before the tray assembly 59 finishes its horizontal movement or it starts its vertical movement.

The tray assembly 59 is sometimes inserted and housed in the cabinet 210 without any cassette 200 placed therein. When no cassette is placed in the tray assembly 59, the tray assembly 59 is stopped and awaited not at its set position but at the third position to shorten the time which starts from the occurrence of eject signal and ends with the tray assembly 59 at its projected, thereby improving the operating feasibility of the cassette setting device. Further, the two cassette detecting switches 8 are located right and left the tray lifter assembly 1. When the cassette 200 is placed in the tray assembly 59 with its short side directed in the forward and rearward direction of the tray assembly 59 or the abnormal cassette such as C and β cassettes is placed in the tray assembly 59, therefore, both of the cassette detecting switches 8 are not brought into off-state, thereby preventing the tray assembly 59 from passing over the third stop position and reaching its set position in the cabinet. The cassette detecting switches 8 are usually under on-state. Even when they are made off-state by some causes, the control section 300 judges that the cassette is set in the tray assembly 59, thereby enabling the following normal operation of the tray assembly 59 to be carried out. The tray assembly 59 is moved in this case to its set position in the cabinet without any cassette placed therein but both of tape end detecting photosensors 23 and 47 which will be described later are made on-state. Therefore, the control section 300 detects abnormality to eject the tray assembly 59 out of the cabinet.

The side chassis assembly 9 comprises the side chassis 10, the rack slider 14, a rack urging spring 15, a drive gear 16, a shift gear spring 17, the shift gear 18, a sensor shutter 19, a shutter spring 20, a shutter shaft screw 21, a sensor holder 22, the photosensor 23 and a tray-down detecting switch 24. The other side chassis assembly 25 comprises the side chassis 26, the rack slider 30, a rack urging spring 31, a drive gear 32, a shift gear spring 33, the shift gear 34, the drive motor 35 and a drive pulley 36. These side chassis 9 and 25 are fixed to the main chassis (not shown) by screws and combined and assembled together with the rear, front and lower front reinforcing plates 37, 85 and 55 to form a gate-like structure.

The rack sliders 14, 30, the springs 15, 31, the shift gears 18, 34 and the shift gear springs 17, 33 are located symmetrical to each other.

Figure 29:
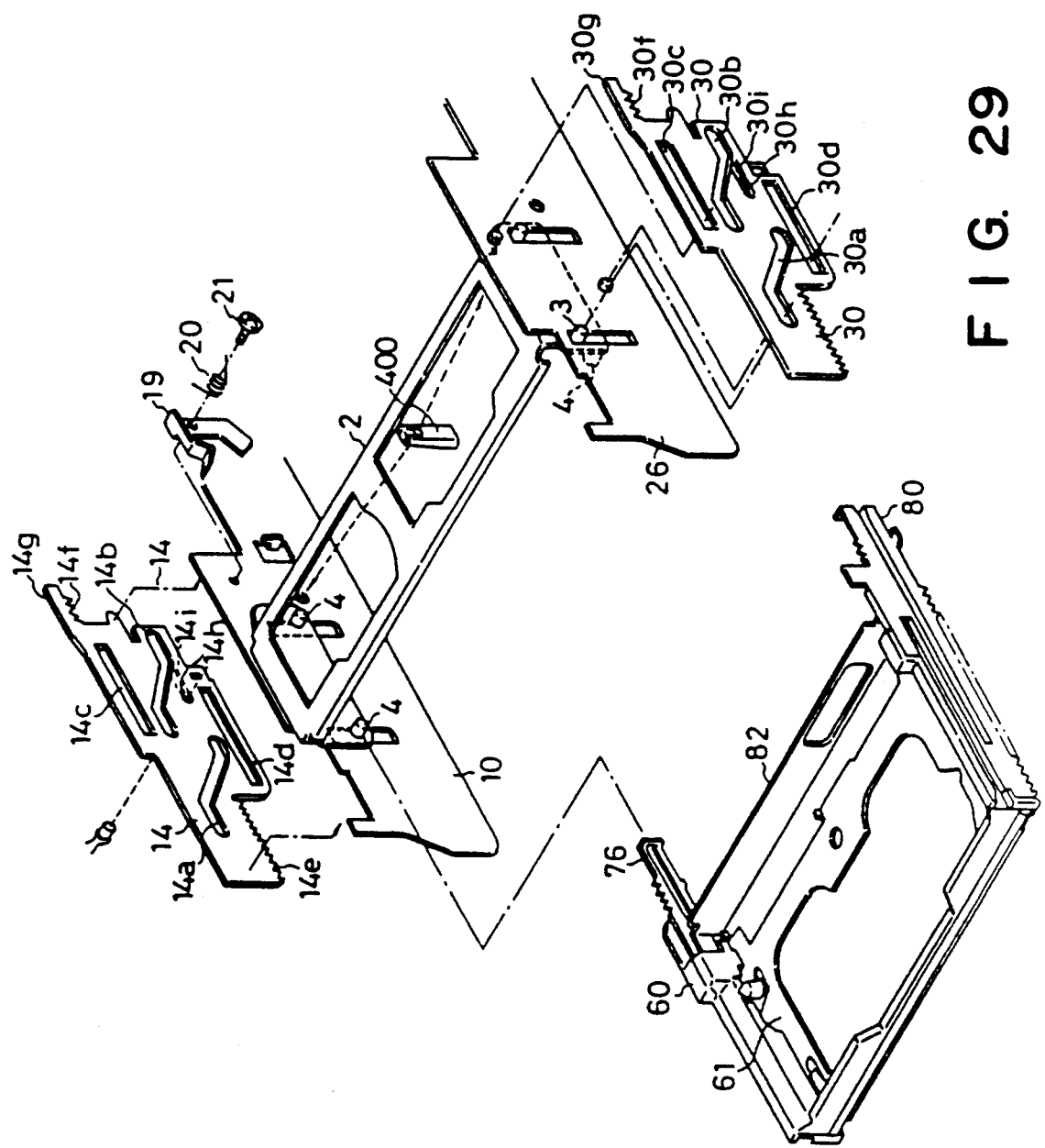
FIG. 29 is a perspective view showing the tray assembly and the lifter dismantled.

The rack sliders 14 and 30 are located outside the side chassis 10 and 26, respectively, as shown in FIG. 29, and rack slider guide bosses 11 and 27 of the side chassis 10 and 26 are engaged with horizontal movement guide grooves 14c, 14d and 30c, 30d of the rack sliders 14 and 30. Lift grooves 14a, 14b and 30a, 30b which cause the tray lifter assembly 1 to be moved up and down, as described above, are provided at front and rear portions of the rack sliders 14 and 30 and between the guide grooves 14c and 14d and between the guide grooves 30c and 30d, and lifter operating pins 3 of the lifter 2 are engaged with these lift grooves.

Each of the lift grooves 14a, 14b, 30a and 30b includes upper and lower horizontal sections arranged parallel to each other with a certain interval interposed between them in the vertical direction and a slope section for connecting the upper and the lower horizontal section to each other. The lower horizontal sections of the lift grooves 14a, 14b, 30a and 30b are provided with pin release preventing projections 141, 142, 301, 302 and pressing steps 143, 144, 303, 304 (which are shown only in FIG. 30 for the sake of illustration). When the tray assembly 59 is moved to the tape drive section, therefore, the lifter operating pins 3 pass over the projections 141, 142, 301 and 302 of the lower horizontal sections and reach the steps 143, 144, 303 and 304 thereof, so that their position can be limited while they are being a little lifted. As a result, even when external force such as the reaction of a belt 44 in a drive system which will be described later, and unexpected vibration is added to the rack sliders 14 and 30, the lifter operating pins 3 can be prevented from moving by load caused by their riding over the steps 143, 144, 303 and 304, thereby keeping the cassette 200 pressed in the tray assembly 59. Even when larger external force is added to the lifter operating pins 3 and the pins 3 are thus moved from the steps 143, 144, 303 and 304, they can be stopped and prevented from moving to the slopes of the lift grooves 14a, 14b, 30a and 30b by the projections 141, 142, 301 and 302. This prevents the lifter operating pins 3 from being floated or lifted while they are being moved to the slopes of the lift grooves, thereby holding the cassette 200 pressed in the tray assembly 59.

Each of the four lift grooves 14a, 14b, 30a and 30b is not needed to be shaped to have the projection and the step but one of them may be shaped to have the projection and the step.

The rack sliders 14 and 30 are urged rearward by the springs 15 and 31. Rack gears 14e and 30e are formed on front undersides of the rack sliders 14 and 30 and toothed with the drive gears 16 and 32 which will be described later to move in the horizontal direction. The rack sliders 14 and 30 are provided at their upper rear ends with rack gears 14f and 30f and flat portions 14g and 30g following the rack gears 14f and 30f. The rack sliders 14 and 30 are moved in the horizontal direction while causing their rack gears 14f and 30f toothed with the shift gears 18 and 34, which are thus rotated. Before the rack gears 14f and 30f are toothed with the shift gears 18 and 34, their flat portions 14g and 30g are struck against those of the shift gears 18 and 34 to correct postures of the shift gears 18 and 34, which are then toothed with the rack gears 14f and 30f of the rack sliders 14 and 30. Tops of the rack gears 14f, 30f and the flat portions 14g and 30g of the rack sliders 14 and 30 are limited in their upward movement by the rear reinforcing plate 37 to thereby guide the rack sliders 14 and 30 in the horizontal direction. Further, when the rack gears 14f and 30f are toothed with the shift gears 18 and 34, tops of the rack gears 14e and 30e of the rack sliders 14 and 30 are limited in their upward movement by bent and drawn portions 10d and 26d of the side chassis 10 and 26 to thereby guide the rack sliders 14 and 30 in the horizontal direction. The toothing of these gears can be thus started and continued with a higher accuracy.

Figure 30:
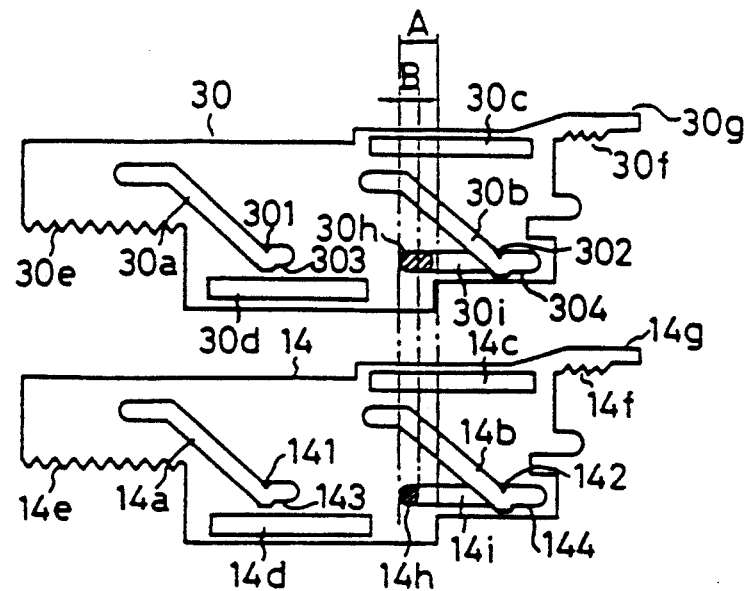
FIG. 30 is a side view showing rack sliders.

The rack sliders 14 and 30 are provided at their rear portions with through-holes 14h and 30h, as shown in FIG. 29, through which light is passed to detect the end of a tape. As shown in FIG. 30, the through-hole 14h has a length A while the other through-hole 30h has a length B in the forward and rearward direction, and these through-holes allow light emitted from a light source 400 to detect the tape end to be passed through, shielded and then passed through them as the rack sliders 14 and 30 move from rear to front. The timing at which light is passed through, shielded and then passed through these through-holes 14h and 30h is set in such a way that light passed through the through-hole 14h is shielded just after the rack slider 14 starts its moving from rear and that light passed through the through-hole 30h is shielded after little time passes since light passed through the through-hole 14h is shielded. This is intended to let the photosensors 23 and 47 have a time difference in their output timings to detect the third stop position of the tray assembly 59, as shown in FIG. 28.

Figure 31:
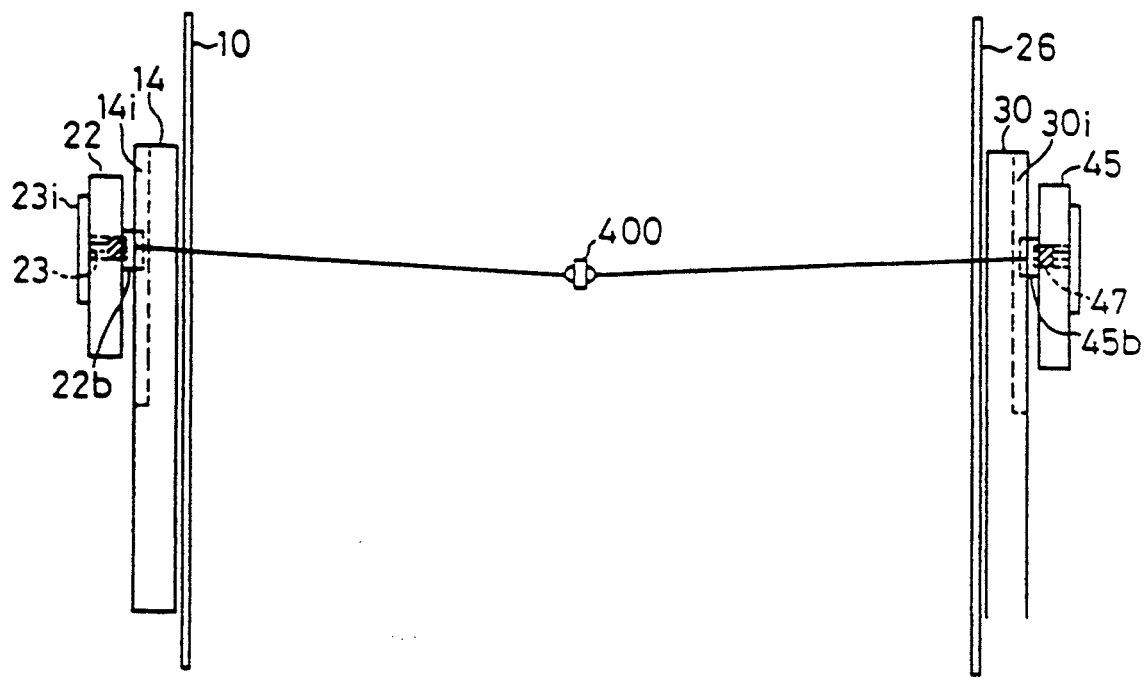
FIG. 31 is a plan showing a tape end detecting means.

Recesses 14i and 30i are formed on outer faces of the rack sliders 14 and 30, extending horizontal in the forward and rearward direction, and these recesses 14i and 30i are provided with the through-holes 14h and 30h. Projections 22b and 45b of sensor holders 22 and 45 are fitted into the recesses 14i and 30i, having some clearance relative to the recesses, as shown in FIG. 31. The projections 22b and 45b have through-holes 22a and 45a through which light is passed to detect the tape end, and the light-receiving elements or photosensors 23 and 47 for detecting the tape end are located outside the projections 22b and 45b. Light can therefore reach the photosensors 23 and 47, passing through the through-holes 22a and 45a, to reliably make the control section 300 operative.

Figure 32:
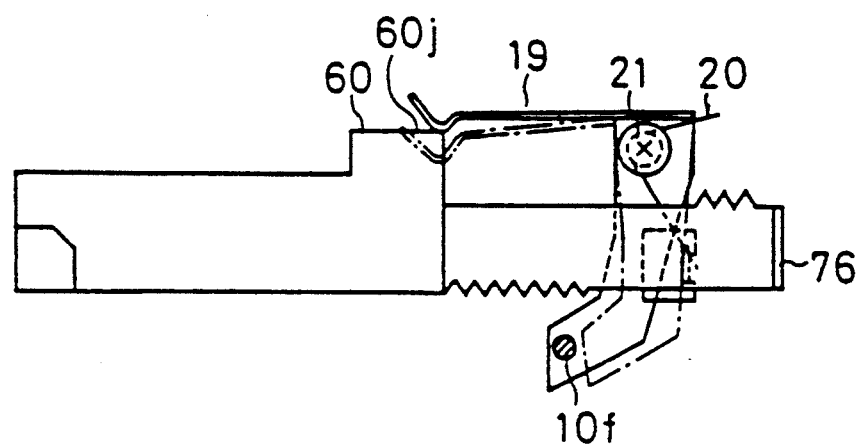
FIG. 32 is a side view showing a tray position detecting means which uses the tape end detecting means.
Figure 33:
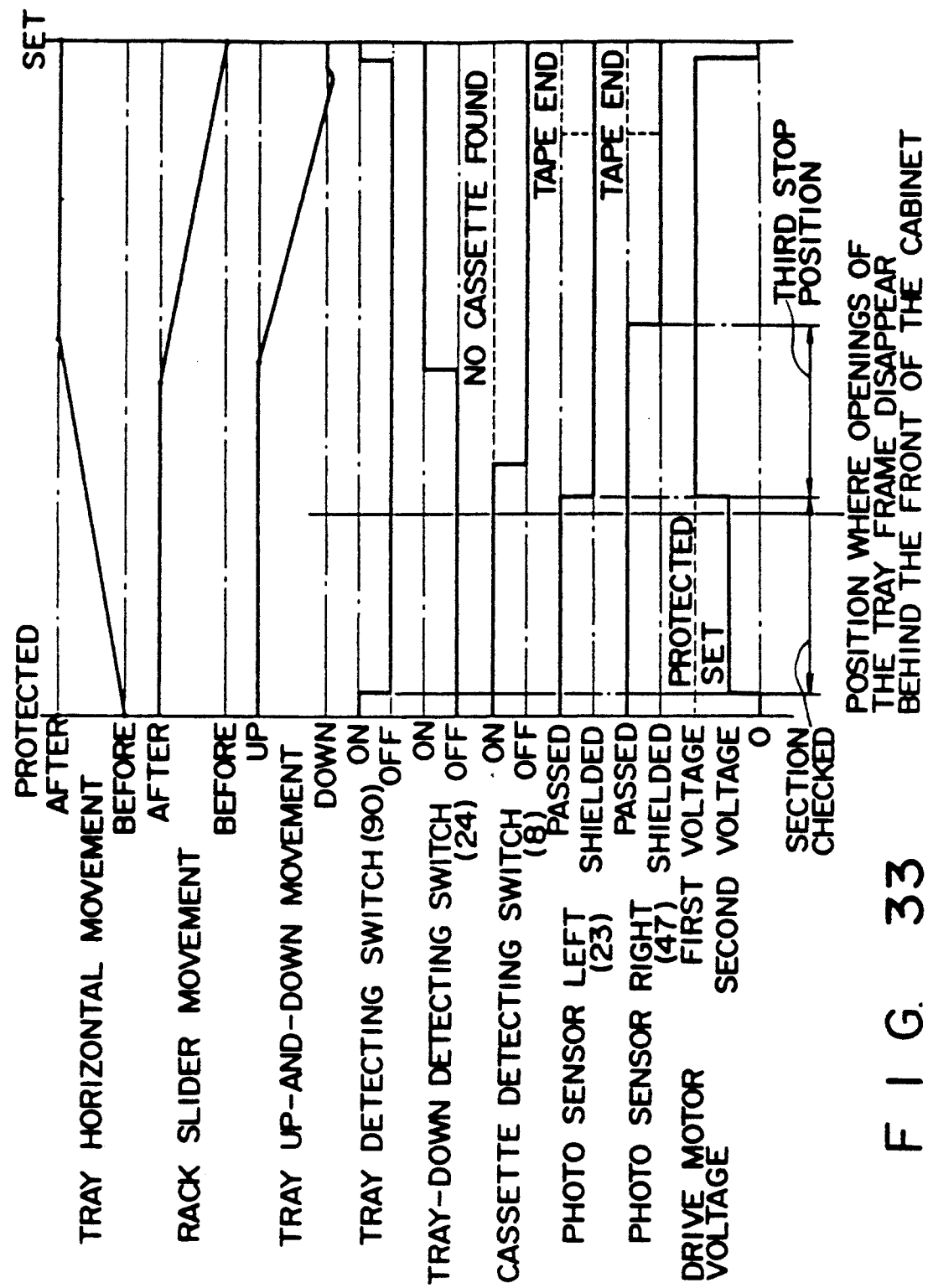
FIG. 33 is a timing chart showing operation timings of the tray position detecting means in FIG. 32.

The sensor shutter 19 is freely swingably attached to the rear inner face of the side chassis 10 by the shaft screw 21 (see FIG. 32). The sensor shutter 19 is a lever serving to shut or close and open a through-hole 10f through which light emitted from the light source 400 is passed to the photosensor 23, and it is usually urged by the shutter spring 20 in such a direction that allows light to pass through the through-hole 10f. This sensor shutter 19 is associated with the slot-in movement of the tray assembly 59. As shown in FIG. 33, the sensor shutter 19 is made operative by a specifically-shaped portion 60j of the tray assembly 59 when the tray assembly 50 is at such a position that is a little before the tray assembly 59 finishes its horizontal movement or when the tray assembly 59 is housed in the front of the cabinet, thereby causing light passed through the through-hole 14h of the rack slider 14 to be shielded or to be further passed to set the third stop position at a desired position. When the third stop position is set before the tray assembly 59 is switched from its horizontal movement to its vertical one, for example, drive force which is needed to be larger for driving the tray assembly 59 in the vertical direction than in the horizontal direction can be switched over to save power.

Outputs of the photosensors 23 and 47 are applied to the control section 300 (see FIG. 11). The control section 300 counts the time during which the tray assembly 59 starts its slot-in movement and comes to the third stop position, and an abnormality detecting logic which causes the control section 300 to judge the movement of the tray assembly 59 abnormal after a certain time is passed and to reverse the drive motor 35 is stored in the control section 300. A time several times longer than the time usually used is set as the certain time, considering the change of circumstances under which the VTR set is used, the aging of the VTR set, irregularities of parts used and the like. In a case where the operator or user inserts the tray assembly 59 into the cabinet with his finger left in the opening 61c of the tray plate 61, for example, the tray assembly 59 can be moved to the third stop position by a smaller drive force and for a shorter time due to the above-described effect of the sensor shutter 19. In addition, the force by which his finger left in the opening 61c is sandwiched between the tray assembly 59 and the cabinet can be made smaller and the time needed to reverse and stop the drive motor 35 can be made shorter. This enables him to be safely projected.

Figure 34:
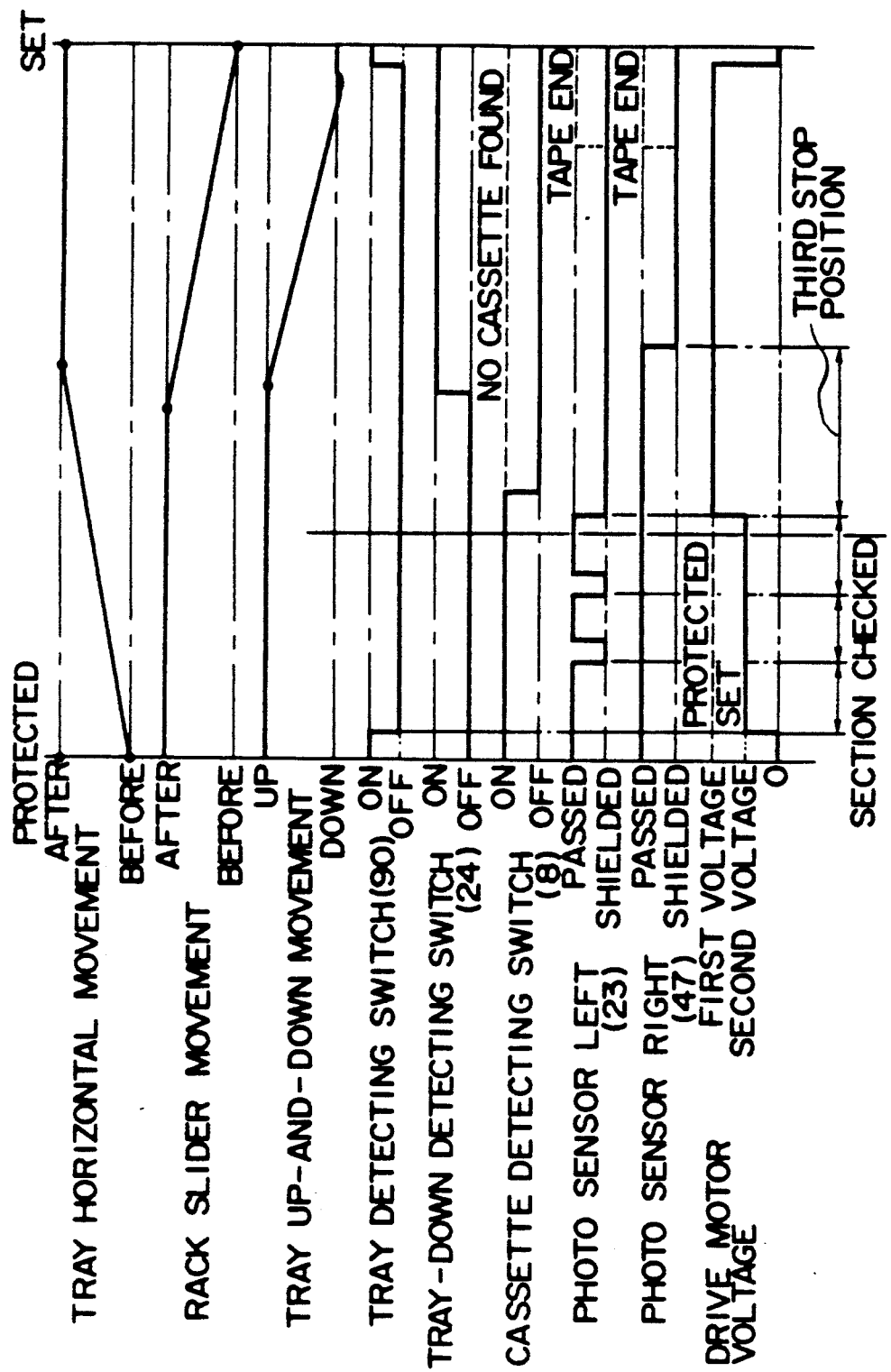
FIG. 34 is a timing chart showing other operation timings of the tray position detecting means.

The abnormality detecting means (or safety measure) which uses the sensor shutter 19 may be arranged so that the left rear end of the tray frame 60 is so differently shaped as to cause the sensor shutter 19 to repeat its closing and opening movement several times relative to the through-hole 10f at such a timing as shown in FIG. 34 so as to speed up the abnormality detection. This is intended to finely divide the section along which the tray assembly 59 starts its slot-in movement and reaches the third stop position by repeating the closing and opening movement of the sensor shutter 19 several times and to cause the control section 300 to judge the time which the tray assembly 59 takes to move each of divided parts of the section so as to detect the movement of the tray assembly 59 abnormal. The detecting time can be thus made by far smaller and even when fingers or hand of the user is sandwiched between the tray assembly 59 and the cabinet, the drive motor 35 can be instantly reversed. This enables the user to be protected safer.

The means for detecting the tray assembly 59 abnormal until the tray assembly 59 starts its slot-in movement and reaches the third stop position is not limited to above-described ones. The section along which the tray assembly 59 starts its slot-in movement and reaches the third stop position may be divided by signals obtained by the combination of a rotating or sliding plate provided with slits and associated with the tray assembly 59 and a photodetector or the combination of plural operating sections and switches arranged at the tray assembly 59.

The shift gears 18 and 34 are pivoted on the rear portions of the side chassis 10 and 26 so as to rotate at a certain angle. They are urged in a direction by the shift gear springs 17 and 33. They can be toothed with the rack gear sections 76b and 80b of the tray rails 76 and 80 and with the rack gear sections 14f and 30f of the rack sliders 14 and 30, as described above, to make changeover between the tray rails 76, 80 and the rack sliders 14, 30 in such a way that the rack sliders 14 and 30 are moved forward by the rearward movement of the tray rails 76 and 80 and that the tray rails 76 and 80 are moved forward by the rearward movement of the rack sliders 14 and 30.

The drive gears 16 and 32 are freely rotatably attached to the outer faces of the side chassis 10 and 26. The drive gears 16 and 32 include gears 16a and 32a toothed with rack gear sections 14e and 30e of the rack sliders 14 and 30 to move the rack sliders 14 and 30, and gears 16b and 32b toothed with and driven by tray drive gears 52 and 53 which will be described later. The rate of gear teeth of the gears 16a and 32a relative to the gears 16b and 32b is set 1:2 to make phases of the gears 16a and 32a fitted to those of the gears 16b and 32b every two teeth of the gears 16b and 32b when these phases of the gears 16a and 32a are to be fitted to those of the gears 16b and 32b. The assembling of the cassette setting device or tray assembly 59 can be thus made simpler. This rate of gear teeth may be not 1:2 but 1: one of integers if at is same as that of small gears 52a and 53a of the tray drive gears 52 and 53 relative to large of the gears 16a, 32a and 16b, 32b can also be gears 52b and 53b thereof. Same merit as in the case achieved in this case. The outer gears 16b and 32b of the drive gears 16 and 32 also serve to prevent the rack sliders 14 and 30 from being floated or lifted and each of these outer gears 16b and 32b has such a tapered portion that allows it to be escaped not to interfere with the rack sliders 14 and 30 when the drive gears 16 and 32 are rotated.

As described above, the side chassis 10 and 26 are provided with the paired drawn portions 10a and 26a, which guide right and left sides of the tray assembly 59 with high accuracy. Further, the side chassis 10 and 26 are provided at their rear portions with the paired rear limits 12 and 28, as described above, which reliably limit the position of the tray lifter assembly 1 in the forward and rearward direction and which enable the rack gears 76b, 80b of the tray rails 76, 80 to be toothed with the shift gears 18, 34 with higher accuracy. Furthermore, the side chassis 10 and 26 are provided with the paired front limits 13 and 29, as described above, which are struck against the tray rail position limits 77 and 81, when the tray assembly 59 is at its projected position, to guide right and left sides of the tray assembly 59 with high accuracy and to reduce the chattering of the tray assembly in the upward and downward direction when the tray assembly 59 is at its projected position.

The switch 24 for detecting the downward movement of the tray assembly 59 is attached to the side chassis assembly 25. This switch 24 is intended to detect whether the tray assembly 59 is moved in the horizontal or vertical direction, and it is made operative by a lower end face 30j of the rack slider 30. Namely, it is held off-state when the rack slider 30 is at its rear position or until the tray assembly 59 starts its horizontal movement from its projected position and finishes it, but it is held on-state until the rack slider 30 starts its movement in the forward direction and finishes it or until the tray assembly 59 starts its vertical movement and comes to its set position in the cabinet. The projected and set positions of the tray assembly 59 are detected by the combination of the switches 24 and 90. The control section 300 judges that the tray assembly 59 is at its projected position when only the tray detecting switch 90 is held on-state and it judges that the tray assembly 59 is at its set position when both of the switches 24 and 90 are held on-state. This makes it unnecessary to use any specific logic program for finding where the tray assembly 59 is, and quick control for the tray assembly 59 can be thus realized even when the detector circuit is re-set during the movement of the tray assembly 59 by power stoppage or pulling the plug out of the socket.

The sensor holder 22 is fixed to the side chassis 10. The sensor holder 22 is provided with plural projections 22b, by which the rack slider 14 can be prevented from floating left and outward. The rack slider 14 can be therefore reliably attached to the tray frame 60 only by the simply-shaped rack slider guide boss 11, thereby making it unnecessary to use any specific attaching parts such as washers. This reduces the number of parts used.

A relay plate 23a is attached to the outer face of the sensor holder 22. The terminal of the photosensor 23 is connected to the relay plate 23a by soldering. The surface of the relay plate 23a is coated black to not allow light outside to enter into the cabinet 210 through the air escaping hole, for example, of the left side of the cabinet to bring the photosensor 23 into malfunction. Light outside can be thus reliably prevented from entering into the photosensor 23.

The drive motor 35 is screw-fixed to the rear portion of the side chassis assembly 25. The drive pulley 36 is fitted onto the shaft of the drive motor 35, which drives a pulley gear 42 through the belt 44 stretched between the drive pulley 36 and the pulley gear 42. The belt 44 is covered by a belt cover (not shown) not to contact wirings and the like.

The tray drive assembly 39 is arranged right and outside the side chassis assembly 25 to reduce the drive force of the drive motor 35. The tray drive assembly 39 comprises a tray drive base 40, a reduction gear 41, the pulley gear 42, a relay gear 43, the belt 44, the sensor holder 45, a relay plate 46 and the photosensor 47.

The reduction gear 41, pulley gear 42 and relay gear 43 are freely rotatably attached to the tray drive base 40. The drive force transmitted to the pulley gear 42 through the belt 44 is reduced by the pulley gear 42 and transmitted to the reduction gear 41 and further reduced by the reduction gear 41 and transmitted to the relay gear 43. The relay gear 43 transmits the drive force thus reduced to a connector gear 50. The tray drive base 40 is fixed to the side chassis 26.

The sensor holder 45 is fixed to the right outer face of the tray drive base 40. The sensor holder 45 is provided at several positions thereof with projections (not shown for the sake of illustrative simplicity) to correspond to the rack slider 30. These projections are passed through escaping holes of the tray drive base 40 to prevent the rack slider 30 from floating right and outward. Reliable attachment of the rack slider 30 can be thus achieved only by engaging it with the simply-shaped rack slider guide bosses 27. This makes it unnecessary to use specific parts such as washers, thereby reducing the number of parts used.

The relay plate 46 is attached to the outer face of the sensor holder 45. The terminal of the photosensor 47 is soldered to the relay plate 46. The surface of the relay plate 46 is coated black not to allow light outside to enter into the cabinet 210 through the air escaping hole of the right side of the cabinet 210 so as to bring the photosensor 47 into malfunction. This reliably prevents light outside from entering into the photosensor 47, as seen in the case of the photosensor 23.

Figure 24:
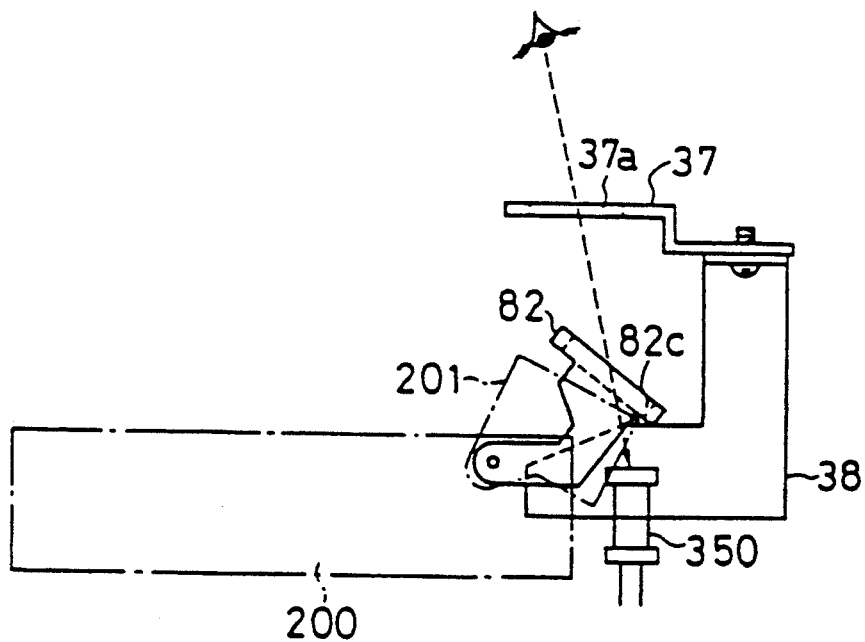
FIG. 24 is a side view showing the cassette stopper operated.
Figure 35:
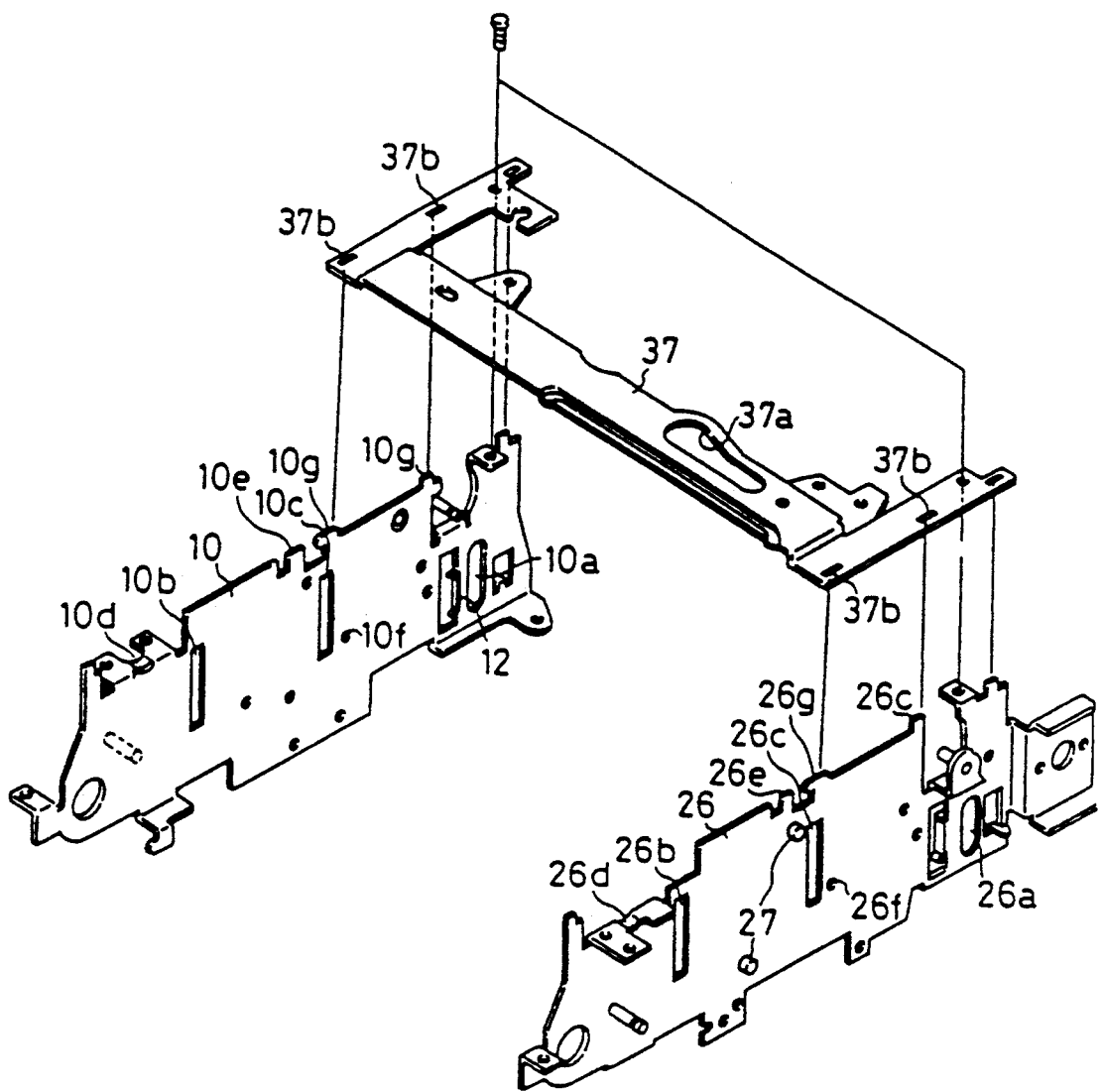
FIG. 35 is a perspective view showing a rear reinforcing plate dismantled.

The rear side of the tray frame is reinforced by the rear reinforcing plate 37 and the cassette lid opener 38. As shown in FIG. 35, the rear reinforcing plate 37 is screw-fixed to the side chassis 10 and 26 by keeping positioning projections 10g and 26g on the tops of the side chassis 10 and 26 fitted in four or more positioning holes 37b arranged front and rear at right and left sides of the rear reinforcing plate 37. The four or more positioning holes of the rear reinforcing plate 37 are simultaneously formed at one process and serve to keep the side chassis 10 and 26 parallel to each other with high accuracy. Further, the rear reinforcing plate 37 is provided with the hole 37a through which the operator can see tape running parts mounted on the main chassis (not shown) when he views the VTR set obliquely from above. This hole 37a of the rear reinforcing plate 37 serve as a window through which the operator can carry out adjusting work relative to the VTR set. The cassette lid opener 38 are screw-fixed to the underside of the rear reinforcing plate 37, serving to release the lid 201 of the cassette 200 and the cassette stopper 82 when the tray assembly 59 is on its slot-in movement (see FIG. 24).

Figure 36:
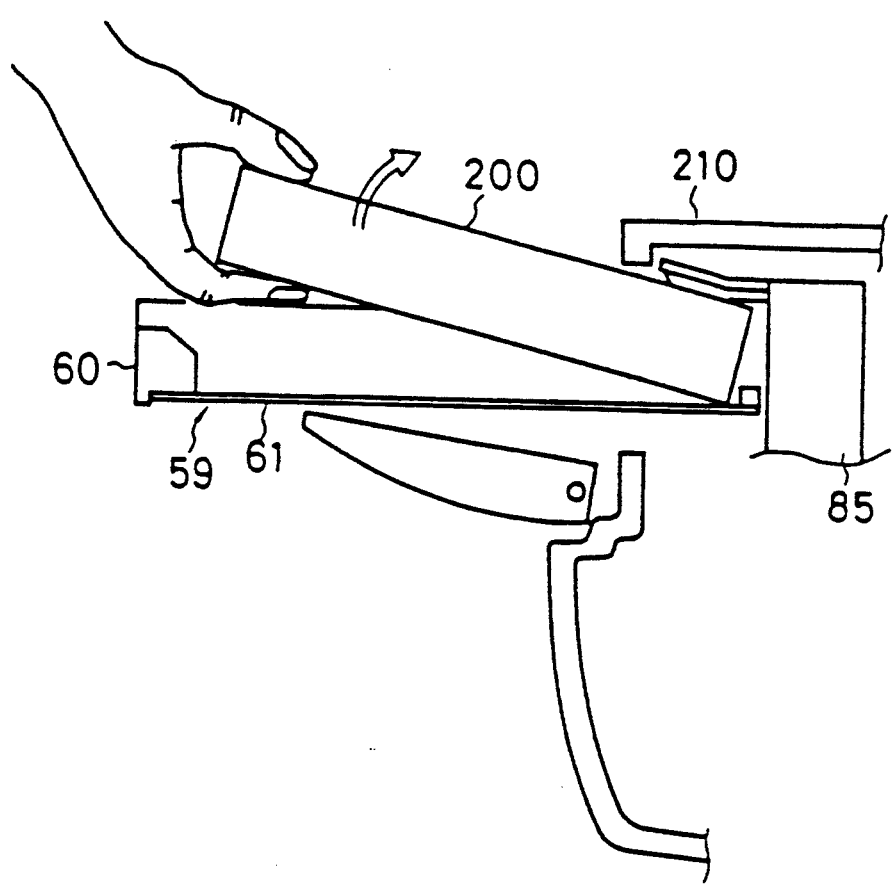
FIG. 36 is a side view showing the operation of a front reinforcing plate.

The front reinforcing plate assembly 84 comprises door lock levers 86, 87, two door lock lever springs 88, the tray detecting lever 89 and the tray detecting switch 90. The front reinforcing plate 85 has positioning holes 85a at right and left ends thereof and positioning projections 10e and 26e on the tops of the side chassis 10 and 26 are fitted into the positioning holes 85a of the front reinforcing plate 85. The front reinforcing plate 85 is screwed to the side chassis 10 and 26 so as to keep these chassis parallel to each other with high accuracy. The front reinforcing plate 85 reinforces the frame in which the operating system is housed, and it also reinforces the cabinet top when the cabinet top is about to be deformed by unexpectedly-strong external force added to the top of the VTR set. Even when the front side of the cassette 200 is lifted up by unexpectedly-strong force to pull the cassette 200 out of the cabinet 210 through the slot, the front of the front reinforcing plate 85 is struck against the cassette 200 to prevent the cassette 200 from pushing up the top of the slot and deforming it (see FIG. 36). It is preferable in this case to bend the front of the front reinforcing plate 85 upward at a certain angle.

The tray detecting lever 89 is freely swingably attached to the front reinforcing plate 85. The tray detecting switch 90 is also attached to the front reinforcing plate 85 to correspond to the tray detecting lever 89. The tray detecting lever 89 is controlled by the rack slider 30 to switch over the tray detecting switch 90. More specifically, the rear or front end 89a or 89b of the tray detecting lever 89 is made operative by a projection 30k of the rack slider 30 or by a projection 80c of the tray rail 80 and the tray detecting switch 90 is thus switched on when the tray assembly 59 is at its projected and set positions. The tray detecting switch 90 reverses the tray detecting lever by its restoring force and it is thus switched over off-state when the tray assembly 59 is not at the above-mentioned both positions.

Figure 37:
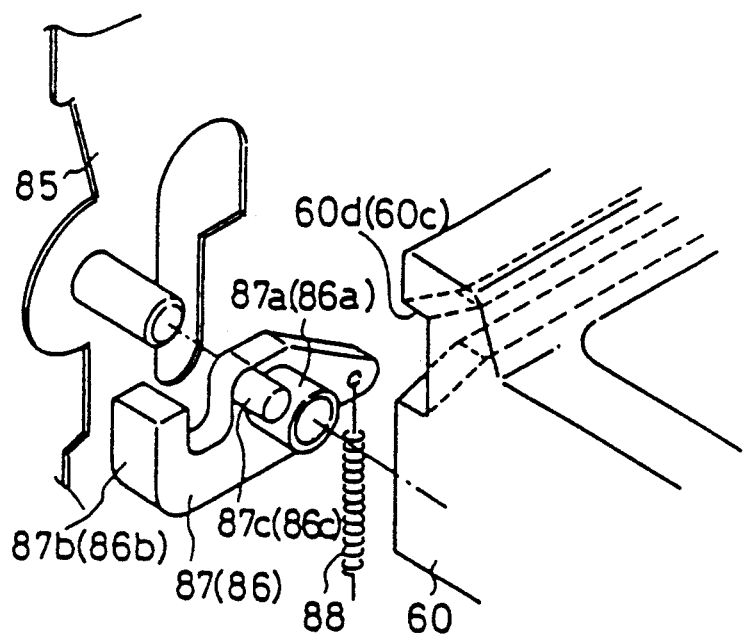
FIG. 37 is a perspective view showing a cassette door lock system.
Figure 38A:
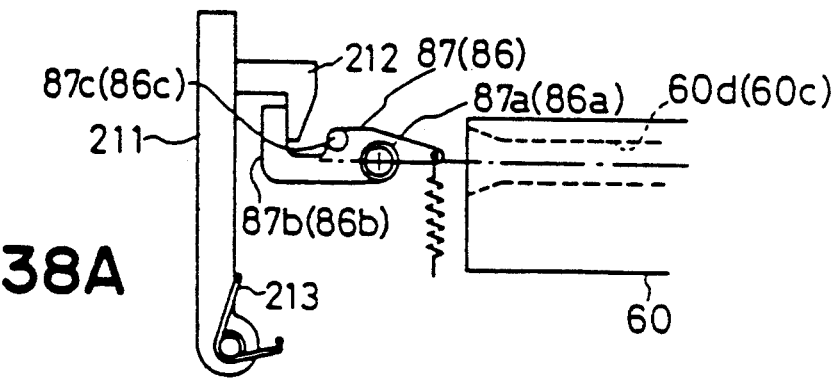
FIGS. 38A and 38B are side views showing the operation of the cassette door lock system.
Figure 38B:
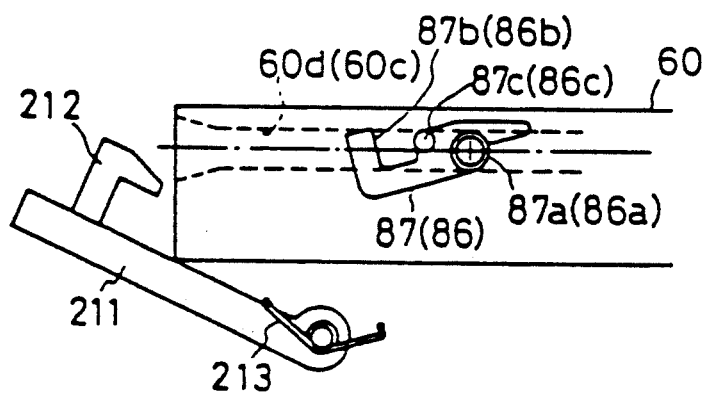

The door lock levers 86 and 87 are freely swingably attached to the front reinforcing plate 85. The door lock levers 86 and 87 have operating posts 86a, 87a, lock claws 86b, 87b and operating posts 86c, 87c. The door lock levers 86 and 87 guide the grooves 60d and 60c of the tray frame 60, as shown in FIG. 37, and they are also controlled by these grooves 60d and 60c to lock and unlock lock members 212 of a tray door 211 which closes and opens the slot of the cabinet 210 through which the cassette 200 is inserted into and pulled out of the cabinet 210 (see FIGS. 38A, 38B and 39).

The tray door 211 is freely swingably attached to the cabinet 210 and urged in the door-closing direction by springs 213. On the other hand, the door lock levers 86 and 87 are urged by door lock lever springs 88 in a direction in which they lock members 212 of the tray door 211. When the tray assembly 59 which is at its set position in the cabinet starts its movement to its projected position, the tray door 211 is pushed and opened against the springs 88 by the tray assembly 59 (see FIG. 38B). The operating posts 86c and 87c of the door lock levers 86 and 87 are now engaged with the grooves 60d and 60c of the tray frame 60 and as the tray assembly 59 is moved to its projected position, the lock claws 86b and 87b of the door lock levers 86 and 87 are released from the lock members 212 of the tray door 211.

As the tray assembly 59 is moved to its projected position, the grooves 60d and 60c of the tray frame 60 are engaged with the operating posts 86a and 87a of the door lock levers 86 and 87 to swing the door lock levers 86 and 87 against the door lock lever springs 88, thereby causing the lock claws 86b and 87b to be unlocked from the lock members 212 of the tray door 211. When the tray assembly 59 reaches its projected position, the tray door 211 is pushed against the springs 88 by the tray frame 60 and thus opened.

Front ends of the lock members 212 of the tray door 211 are so tapered as to push away the lock claws 86b and 87b of the door lock levers 86 and 87. This is to enable the tray door 211 to be closed to its final position even if the lock members 212 of the tray door 211 interfere with the lock claws 86b and 87b of the door lock levers 86 and 87 because of irregularities of parts used when tray door 211 is to be closed.

When the tray assembly 59 is moved from its projected position to its set position, the operating posts 86c and 87c of the door lock levers 86 and 87 are released from the grooves 60c and 60d of the tray frame 60, causing the door lock levers 86 and 87 to be swung by the door lock lever springs 88. The lock claws 86b and 87b of the door lock levers 86 and 87 are thus engaged with the lock members 212 of the tray door 211 to lock the tray door 211 at its closed position (see FIG. 38A).

When the tray assembly 59 is housed and set in the cabinet 210, the tray door 211 is locked in this manner while being kept closed, thereby preventing the operator from being injured, sandwiching his fingers between the tray frame and the cabinet, for example, when the tray assembly 59 is moved to its projected position.

A second opening and closing switch 100 is arranged between the tray door 211 and the cabinet 210, using an elastic member (not shown), and it is switched over by the pre-pressure of the elastic member when the tray door 211 reaches its closed position (see FIG. 39). The second opening and closing switch 100 is kept off-state with a certain clearance interposed relative to the tray door 211 when the tray door 211 is closed as shown in FIG. 39, but when it is further urged against the elastic member to its closed final position, the second opening and closing switch 100 is turned on. The elastic member which serves as a limiter for the cassette door 211 can be used as the second opening and closing switch 100 itself. When the tray door 211 is closed, the tray assembly 59 can be moved to its projected position by pushing a different opening and closing switch 101 or by pushing the cassette door 211.

Output terminals of the second opening and closing switches 100 and 101 are connected to the control section 300, which causes the tray door 211 to be opened and closed responsive to the switches turned on and off.

The lower front reinforcing plate assembly 54 comprises the lower front reinforcing plate 55, two right and left pop-up control lever holder plates 56, two right and left pop-up control levers 57 and two right and left pop-up control lever springs 58. The lower front reinforcing plate 55 is attached to the front reinforcing plate 85 while being sandwiched between the side chassis 10 and 26. The lower front reinforcing plate 55 serves to reinforce the tray frame in which the operating system is housed, to keep the side chassis 10 and 26 parallel to each other with high accuracy to have a certain dimension interposed between them, and to blind from the operator the inside of the tray assembly 59. The pop-up control lever holder plates 56 for supporting the freely swingable pop-up control levers 57 are screw-fixed to right and left ends of the lower front reinforcing plate 55. As described above, the pop-up control levers 57 are engaged with the bent portions 62c and 66c of the pop-up sliders 62 and 66 for the tray assembly 59 to make the selective pop-up system operative. The pop-up control levers 57 are urged by the pop-up control lever springs 58 to engage the bent portions 62c and 66c of the pop-up sliders 62 and 66 and when the tray assembly 59 is to be moved to its projected position, the pop-up control levers 57 are engaged with the bent portions 62c and 66c of the pop-up sliders 62 and 66 but when it is to be moved to its set position, they are pushed by the bent portions 62c and 66c of the pop-up sliders 62 and 66 to swing in their escaping direction.

Figure 41:
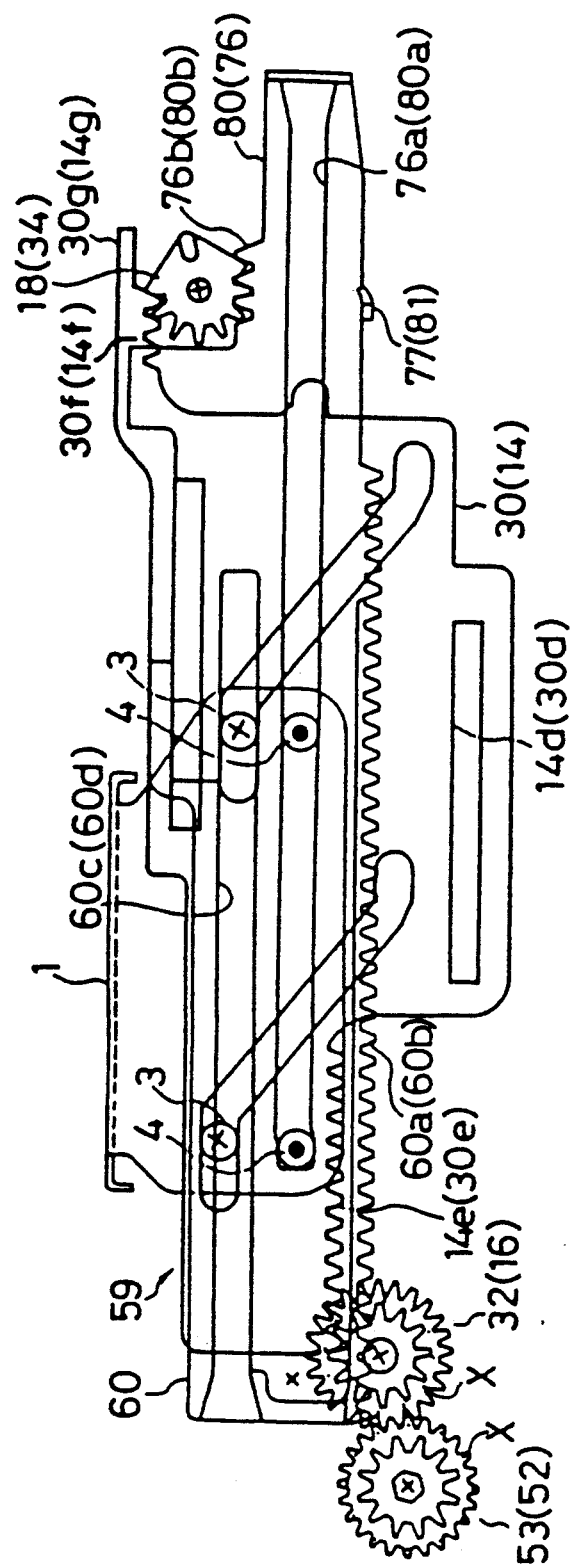
FIG. 41 is a side view showing a system for carrying and driving the tray assembly through the tray drive gears.
Figure 42:
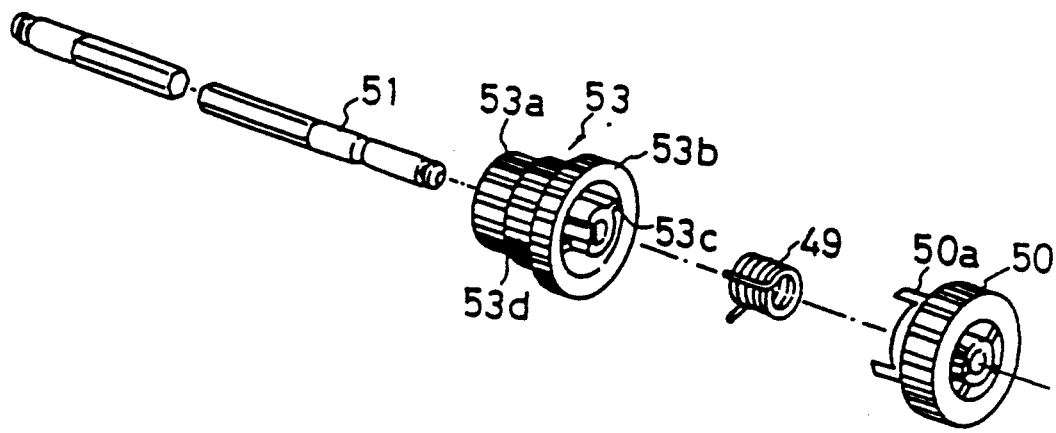
FIG. 42 is a perspective view showing the tray drive gear and a connector gear dismantled.

A drive transmitter section for synchronously transmitting drive force to the right and left side chassis comprises a connector spring 49, the connector gear 50, a tray drive shaft 51, and tray drive gears 52, 53. The tray drive shaft 51 passes through the side chassis 10 and 26 and the tray drive gears 52 and 53 are attached to right and left ends of the tray drive shaft 51. The tray drive gears 52 and 53 include small gears 52a and 53a toothed with the rack gears 60a and 60b of the tray frame 60, as shown in FIG. 40, and large gears 52b and 53b each having an outer diameter a little larger than that of the small gears 52a and 53a and toothed with bearings 52d and 53d supported by the side chassis 10 and 26 and with rack gears 14e and 30e of the rack sliders 14 and 30 (see FIG. 41). The tray drive gears 52 and 53 can be thus resin-molded by a simple split die. They are attached to the tray drive shaft 51 which is injection-molded hexagonal, as shown in FIG. 42, and each of their small gears 52a and 53a is set to have a number of teeth which is a multiple of 6. They can be thus easily assembled without paying any attention to their right and left gear phases. Further, the rate of gear teeth between the small gears 52a, 53a and the large gears 52b, 53b is set 1:2 (or twelve teeth:twenty four teeth, for example) same as that of gear teeth between the gear members 16a, 32a of the drive gears 16, 32 and the gear members 16b, 32b thereof. The small gears 52a, 53a and the large gears 52b, 53b are marked by X in such a way that their phases can coincide with each other every two teeth of them (see FIG. 41), and they are assembled each other, making their marks X coincident with each other. The rate of gear teeth do not have to be set at 1:2, but at the same rate of gear teeth between the inner gear members 16a, 32a of the drive gears 16, 32 and the outer ones 16b, 32b thereof. Thus, the same merits can also be achieved in this case.

Although each of the small gear members 52a and 53a of the tray drive gears 52 and 53 has been made to have same number of teeth as that of each of the gear members 16a and 32a of the drive gears 16 and 32, and the rack gears 76b, 80b of the tray rails 76, 80 and the rack gears 14f, 30f of the rack sliders 14, 30 have been made operative by the same shaft gears 18 and 34, it is not needed that they have same number of teeth and same module. In this case, however, it is needed that the rate of pitch circle radii between the small gear members 52a, 53a of the tray drive gears 52, 53 and the inner gear members 16a, 32a of the drive gears 16, 32 is made same as that of the gear section of the shaft gear 18 relative to the gear section of the shaft gear 34.

When each of the gear members 16a and 32a of the drive gears 16 and 32 is made to have a pitch circle radius larger than that of each of the small gear members 52a and 53a of the tray drive gears 52 and 53, for example, the speed reduction ratio of horizontal movement of the tray assembly 59 which is driven by the tray drive gears 52 and 53 becomes high to make small the force with which fingers or hand of the operator is sandwiched and injured between the tray assembly 59 and the cabinet. As described above, the load needed to drive the tray assembly 59 in the horizontal direction is smaller than that needed to drive it in the vertical direction. When different pitch circle radii are given to the gear members to provide an appropriate speed reduction ratio as described above, therefore, only one kind of drive voltage can be used to allow the drive motor 35 to drive the tray assembly 59 with safety and high reliability. When it is arranged that both of the horizontal and vertical movements of the tray assembly 59 can be realized in this manner, using only one kind of drive voltage but without setting drive voltage for driving the tray assembly 59 in the horizontal direction lower than that for driving it in the vertical direction. That force with which fingers or hand of the operator is sandwiched and injured between the tray assembly 59 and the cabinet can be made small without slowing down the slot-in movement of the tray assembly.

Further, the connector gear 50 is coaxially attached to the tray drive gear 53 through the connector spring 49. Drive force is transmitted from the relay gear 43 to the connector gear 50, which transmits the drive force to the tray drive gears 52, 53 and the tray drive shaft 51. When the drive force is transmitted to the tray drive gears 52, 53 and the tray drive shaft 51 in this manner and then to the right and left side chassis, backlash of the gears can be prevented from giving any influence to the tray assembly 59 which is under movement, thereby enabling the tray assembly 59 to be smoothly moved between its projected and set positions.

Figures 43A, 43B, 43C:
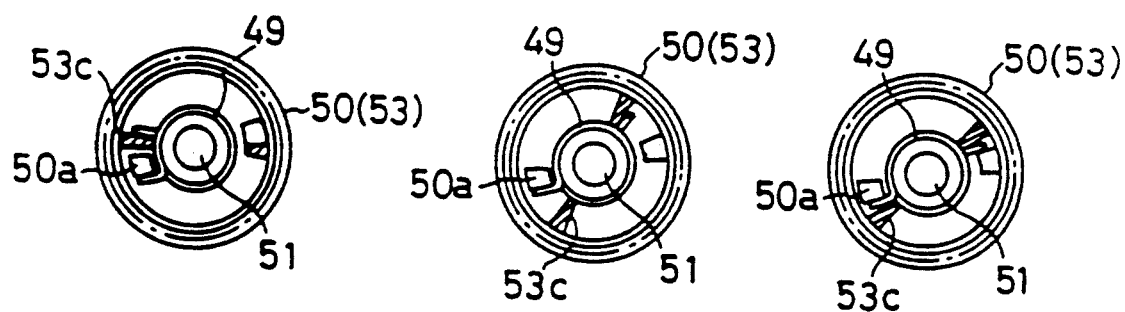
FIGS. 43A through 43C are front views showing how the tray drive gear and the connector gear are operated.

The connector spring 49 is interposed between the tray drive gear 53 and the connector gear 50 while hooking its ends on bosses 53c and 50a of the gears 53 and 50. When the tray assembly 59 is at its projected position, the drive force of the connector gear 50 is transmitted to the tray drive gear 53 through the connector spring 49 (see FIG. 43B). When the tray assembly 59 is at its set position, the drive force of the connector gear 50 is transmitted directly to the tray drive gear 53 (see FIG. 43A). When the tray assembly 59 which is at its projected position is pushed to start its slot-in movement, the tray drive gears 52 and 53 are rotated by the rack gears 60a and 60b of the tray assembly 59. The connector gear 50 is connected this time directly to the drive motor 35 and cannot rotate because of large operating load, but the tray drive gears 52 and 53 are rotated because the connector spring 49 bends (see FIG. 43C). When the operating section of the tray assembly 59 is released from the tray detecting lever 89 as described above, the tray detecting switch 90 is switched over from on-state to off-state and the drive motor 35 is thus rotated to start the slot-in movement of the tray assembly 59.

When the tray detecting switch 90 is changed over from on-state to off-state, the tray drive gears 52 and 53 can further rotate relative to the connector gear 50 by an extent to which the connector spring 49 can bend. When the tray assembly 59 is pushed against the connector spring 49 by small force, therefore, the tray assembly 59 can be moved by this bending extent of the connector spring 49 and the tray detecting switch 90 is thus switched on to cause the tray assembly 59 to start its slot-in movement.

A click system for holding the tray assembly 59 at its projected position may be used instead of the connector spring 49. In this case, the drive motor 35 is kept rotating until the tray assembly 59 is held at its projected position by the click system, and the drive motor 35 is then a little reversed to rotate the connector gear 50 relative to the tray drive gears 52 and 53 while keeping the tray detecting switch turned off. The tray drive gears 52 and 53 can be thus separated from the drive motor 35 until the boss 53c of the tray drive gear 53 is struck against the boss 50a of the connector gear 50 when the tray assembly 59 is at its projected position. Therefore, force needed to insert the tray assembly 59 into the cabinet is enough only to release the click system, thereby enabling the tray assembly 59 to be inserted into the cabinet by such small force as seen in the case of the connector spring 49.

As seen in the case where the click system is used, the connector spring 49 further keeps the tray gears 52 and 53 rotating even after the tray assembly 59 is projected from the cabinet. When the connector spring 49 is thus bent and escaped, drive force is transmitted directly by the bosses 53c and 50a projected from the tray drive gear 53 and the connector gear 50 to finish the projected movement of the tray assembly 59. The drive motor 35 is then a little reversed and stopped while keeping the tray detecting switch 90 turned off, and the connector gear 50 is thus rotated relative to the tray drive gears 52 and 53 by a certain angle. The urging force of the connector spring 49 can be thus further reduced, thereby enabling the tray assembly 59 to be inserted into the cabinet by small force.

A damper 92 is attached to the outer face of the side chassis assembly 26 in such a way that it is toothed with the drive gear 32. It serves to make the projected movement of the tray assembly 59 smooth and it is arranged to have clutch function only in one direction, for example, in such a way that it does not perform damper function when the tray assembly 59 is inserted into the cabinet, but that it performs a damper function when the tray assembly 59 is projected from the cabinet. Force which is added to insert the tray assembly 59 into the cabinet can be thus reduced by such a part that must be added to the damper 92. The damper 92 comprises a gear 92a toothed with the drive gear 32 and a damper body 92b, as shown in FIG. 44. A rotating boss 92c coaxial to the rotating center shaft of the gear 92a is attached to the damper body 92b and projected inside the side chassis 26, passing through guide slit 26f of the side chassis 26, as shown in FIG. 45. A rotating plate 110 provided with escaping and engaging portions 110a and 110b is fixed to the rotating boss 92c with the side chassis 26 interposed between them to hold the damper freely rotatable and slidable along the slit 26f. The side chassis 26 is provided with a projection 26g engaged with the engaging portion 110b of the rotating plate 110.

When the drive gear 32 is rotated in the direction in which the tray assembly 59 is projected from the cabinet, as shown in FIG. 46B, the damper 92 is urged in the forward direction by a little rotating load of the rotating boss 92c and the slit 26f and by the rotating direction of the drive gear 32, so that the projection 26g of the side chassis 26 can be engaged with the engaging portion 110a of the rotating plate 110. The damper 92 is thus made operative to serve as a damper because the rotation of the damper body 92b is stopped (see FIG. 46B).

When the drive gear 32 is rotated in the direction in which tray assembly 59 is inserted into the cabinet, the damper 92 is urged in the rearward direction by the rotating direction of the drive gear 32, a little rotating load of the rotating boss 92c and the slit 26f, and the escaping portion of the rotating plate 110, so that the engaging portion 110b of the rotating plate 110 can be released from the engaged projection 26g of the side chassis 26. The damper 92, therefore, is not made operative to serve as a damper because its damper body 92b rotates together with its gear 92a (see FIG. 46A). The rotating direction of the drive gear 32, the slit 26f of the side chassis 26, the small rotating load of the rotating boss 92c and the slit 26f, the engaged projection 26g of the side chassis 26, and the rotating plate 110 cooperate with one another in this manner to form the one-way damper.

It will be described how the cassette 200 is inserted into and projected from the cabinet.

When no cassette 200 is housed in the tray assembly 59, the tray assembly 59 is stopped at the third stop position. When the tray assembly 59 which is under this state is to be inserted into the cabinet, the opening and closing switch 101 or tray door 211 is pushed. The second opening and closing switch 100 which is made operative by the opening and closing switch 101 or tray door 211 is thus turned on to apply on-signal to the control section 300 (see FIG. 11). The control section 300 supplies drive signal to a drive circuit 301 responsive to this on-signal. The drive circuit 301 causes the drive motor 35 to be rotated by a first voltage supplied from a power source circuit 302 to project the tray assembly 59 from the cabinet. Since no cassette is present in the tray assembly 59 this time, the two pop-up levers 70 of the tray assembly 59 are moved downward by the selective pop-up system, thereby enabling the cassette 200 to be housed in the tray assembly 59.

When the tray assembly 59 is on the way of its moving in the forward direction, the tray detecting lever 89 is made operative by the operating section of the tray assembly 59 and the tray detecting switch 90 is switched over from the off-state to the on-state. The control section 300 detects this on-state of the tray detecting switch 90 to cause the drive motor 35 to be rotated at the first voltage for a predetermined time period and then reversed at second voltage for a predetermined time period. Terminals of the drive motor 35 are shortcircuited to brake and stop the drive motor. These terminals of the drive motor 35 are then made open to make the drive motor 35 ready for a next step. The tray assembly 59 can be thus kept projected. The first voltage is used for normal operation and the second voltage is set lower than the first one in the power source circuit which is intended to protect the operator safely.

The reason why the drive motor 35 is rotated as described above for the predetermined time period when the tray assembly 59 is at its projected position resides in that the tray assembly 59 is reliably urged to its projected final position. The reason why the drive motor 35 is reversed for the predetermined time period resides in that the connector gear 50 is rotated relative to the tray drive gears 52 and 53 only by a certain extent to make the tray assembly 59 ready for a next "slot-in" movement of the tray assembly 59. When the drive motor 35 is reversed at the second voltage for the certain time period and a shortcircuit is caused between the terminals of the drive motor 35, this relative rotation of the connector gear 50 to the certain extent enables the tray drive gear 53 to be stopped at such a position with high accuracy that allows the tray drive gear 53 to be rotated relative to the connector gear 50 even after the tray assembly 59 is pushed to change over the tray detecting switch 90 from the on-state to the off-state.

The opening between the terminals of the drive motor 35 is a measure for a case where the drive motor 35 is not rotated by some cause. In the case where the tray assembly 59 is manually inserted into the cabinet 210, for example, the drive motor 35 is made operative on the way of inserting the tray assembly 59 into the cabinet. However, the tray assembly 59 can be inserted into the cabinet 210 by a relatively small force because the opening is kept between the terminals of the drive motor 35 until the drive motor 35 is made operative. Even when the VTR set is not connected to the power source, the tray assembly 59 can be inserted into the cabinet 210 by a relatively small force because the opening is kept between the terminals of the drive motor 35.

When the opening and closing switch 101 is changed over or the tray assembly 59 is pushed as described above, the tray assembly 59 can be moved from its projected position to its slot-in position. In the case where the opening and closing switch 101 is pushed, the control section 300 detects this on-state of the switch 101 to cause the drive motor 35 to be rotated at the second voltage through the drive and power source circuits 301 and 302, so that the tray assembly 59 can be inserted into the cabinet 210. In the case where the tray assembly 59 is pushed, the tray drive gears 52 and 53 which are made operative by the rack gears 60a and 60b of the tray assembly 59 are rotated relative to the connector gear 50 due to the bending of the connector spring 49 and separated from the drive motor 35, so that the tray assembly 59 can be inserted into the cabinet 210 by a small force. When the tray assembly 59 is pushed into the cabinet 210 and the operating section of the tray assembly 59 is released from the tray detecting lever 89, the tray detecting switch 90 is changed over from the on-state to the off-state. The control section 300 detects this off-state of the tray detecting switch 90 to cause the drive motor 35 to be rotated at the second voltage via the drive and power source circuits 301 and 302, so that the tray assembly 59 can be inserted into the cabinet 210.

When the tray assembly 59 is at its projected final position, light for detecting the tape end is passed through the tray assembly 59. When it is at the third stop position adjacent to its slot-in position, light is shielded by the rack slider 14 or sensor shutter 19 and the rack slider 30 at the left side of it but passed through the right side of it.

When the tray assembly 59 in which no cassette is housed is inserted into the cabinet 210, the cassette detecting switches 8 are not turned off at the third stop position where the tray assembly 59 is stopped or at the position where light for detecting the tape end is shielded at the left side of the tray assembly 59. The control section 300 detects this on-state of the cassette detecting switches 8 to cause the drive motor 35 to be stopped at the third stop position.

When the tray assembly 59 in which the cassette 200 is housed is inserted into the cabinet 210, the cassette detecting switches 8 are changed over from the on-state to the off-state before the tray assembly 59 reaches the third stop position. The control section 300 regards the position where light for detecting the tape end is shielded at the right side of the tray assembly 59 as the third stop position and sends to the drive circuit 301 a changeover signal by which voltage for the drive motor 35 is changed over from the second voltage to the first voltage. The drive circuit 301 changes over voltage supplied from the power source circuit 302 to the first voltage and controls the drive motor 35 to cause the tray assembly 59 to be further inserted into the cabinet 210. The tray assembly 59 is moved rearward in the horizontal direction by the tray drive gears 52 and 53 which are toothed with the rack gears 60a and 60b, and when the tray assembly 59 reaches the final position of its horizontal movement, the rack gears 76b and 80b of the tray rails 76 and 80 are toothed with the shift gears 18 and 34 to rotate the shift gears 18 and 34. These shift gears 18 and 34 are thus toothed with the rack gears 14f and 30f of the rack sliders 14 and 30 to slide the rack sliders 14 and 30 in the forward direction. The rack gears 60a and 60b of the tray frame 60 are released from the tray drive gears 52 and 53 and the rack sliders 14 and 30 are toothed with the drive gears 16 and 32 in changeover manner and further slid in the forward direction, so that the tray assembly 59 can be housed and held in the tray lifter assembly 1. When the rack sliders 14 and 30 are slid in the forward direction, the lifter operating pin 3 is guided by the lift grooves 14a, 14b and 30a, 30b of the rack sliders 14 and 30 to lower the tray lifter assembly 1. The tray assembly 59 is thus lowered to set the cassette 200 at the tape drive section. The switch 24 is switched over from the off-state to the on-state, associating with the forward slide of the rack slider 14. At the same time, the rack slider 30 which is at the final position of its forward slide makes the tray detecting lever 89 operative to change over the tray detecting switch 90 from the off-state to the on-state. The control section 300 detects that the switch 24 is under on-state and that the tray detecting switch 90 has been changed over from the off-state to the on-state and stops the drive motor 35. The slot-in movement of the tray assembly 59 is thus finished.

The control section 300 checks the time which the tray assembly 59 takes to start its slot-in movement and to reach the third stop position, and when the abnormality detecting time which is set by multiplying the normal operating time by an allowance coefficient is passed, the control section 300 detects abnormality and the drive motor 35 is thus reversed to project the tray assembly 59 out of the cabinet 210. When the operator inserts the tray assembly 59 in which no cassette is housed into the cabinet 210 while leaving his fingers or hand sandwiched between the cabinet 210 and the tray frame 60, therefore, abnormality is detected by the control section 300 and the drive motor 35 is thus reversed to project the tray assembly 59 from the cabinet 210. The slot-in movement of the tray assembly 59 is carried out in this case, using the second voltage. Therefore, the force with which fingers or hand of the operator is sandwiched between the cabinet 210 and the tray frame 60 is so reduced as to protect the operator safely.

The time checked may be set not as the time starting from the slot-in movement of the tray assembly 59 and ending with the arriving of the tray assembly 59 at the third stop position, but as the time starting from the slot-in movement of the tray assembly 59 and ending with the changeover of the cassette detecting switches 8 from the on-state to the off-state. For example, the position of the tray assembly 59 at which the cassette detecting switches 8 are changed over may be set a little before the third stop position and where the tray assembly 59 disappears in the cabinet 210. Namely, the time checked lasts until the cassette detecting switches 8 are changed over. When the time checked is set in this manner, the abnormality detecting time which is set by multiplying the normal operating time by an allowance coefficient can be shortened to further enhance the safety of the operator.

Drive motor voltage which is changed over from the second to the first voltage on the way of inserting the cassette-housed tray assembly 59 into the cabinet 210 may be changed over at a position where the cassette detecting switches 8 are change a over. When the tray assembly 59 in which no cassette is housed is inserted into the cabinet 210 in this case, it can be preferentially stopped at the time when it reaches the third stop position.

When the cassette 20 is to be picked up from the tray assembly 59 which is in the cabinet 210, the opening and closing switch 101 is again changed over or the tray assembly 59 is again pushed. The control section 300 detects the changeover signal which tells that the opening and closing switch 101 or second opening and closing switch 100 has been changed over on-state, thereby causing the drive motor 35 to be rotated in the tray-assembly-projecting direction at the first voltage. The drive gears 16 and 32 are changed over the tray rails 76 and 80 in an order reverse to the case where the tray assembly 59 is inserted into the cabinet 210, and the tray assembly 59 is thus projected from the cabinet. When the tray assembly 59 is projected from the cabinet 210 in this manner, the above-mentioned selective pop-up system works to lift one ends of the pop-up ievers 70 upward. The front side of the cassette 200 in the tray assembly 59 is thus lifted upward and the operator can pick up the cassette 200 out of the tray assembly 59. When the cassette 200 is picked up by the operator, the selective pop-up system again works to lower the one ends of the pop-up levers 70 and return them to their original position. The tray assembly 59 is thus made ready for a next cassette.

According to the cassette setting device as described above, the side wall of the tray frame 60 of the tray assembly 59 is provided with the through-hole 60f through which the unloaded C cassette detecting lever 251 of the C cassette adapter 250 is passed. During the slot-in movement of the tray assembly 59, the cassette setting device detects whether or not the unloaded C cassette detecting lever 251, of the C cassette adapter 250, is operative. When the unloaded cassette detecting lever 251 detects that no cassette is placed in the tray assembly 59, the tray assembly 59 projects outside of the cabinet. When the cassette adapter 250 is placed in the tray assembly 59, under such a condition that the unloaded C cassette detecting lever 251 is inoperative, the detecting lever 251 projects into the groove 76a of the tray rail 76 through the through-hole 60f. The detecting lever 251 thus strikes against the guide roller 4, when the tray assembly 59 is being moved into the cabinet. When the control section 300, which has a timer working at the start of the slot-in movement of the tray assembly 59, for example, determines that no cassette is detected for a certain time period, the drive motor for the tray assembly 59 is reversed. This prevents the C cassette adapter 250 from being set incorrectly at the tape drive section in the cabinet. Mechanical systems or parts at the tape drive section, can be reliably prevented from damage caused by a C cassette adapter 250 that has been incorrectly placed in the tray assembly 59.

It should be therefore understood that the present invention is not limited to the above-described embodiment but that various changes and modifications can be made without departing from the spirit and scope of the present invention.

INDUSTRIAL APPLICABILITY

According to the cassette setting device of the present invention as described above, the C cassette adapter in which no C cassette is loaded can be detected on the way of its being inserted into the cabinet to project the tray assembly 59 to the first position even when the unloaded C cassette adapter is placed in the tray assembly 59. Therefore, a cassette setting device suitable for use with video tape recorders and others which make it necessary for the cassettes to be inserted into them can be provided.

I claim:

1. A cassette setting device, for loading a first tape cassette and a second tape cassette, said second tape cassette being of smaller dimensions than the dimensions of the first tape cassette, comprising:

a cabinet for housing therein a tape drive section at which the first tape cassette and the second tape cassette may be placed;

a tray arranged in the cabinet and having a first position where the tray is projected form a front side of the cabinet and a second position where the tray is set at the tape drive section in the cabinet;

a carriage system for carrying the tray between the first and the second position;

a cassette adapter in which the second tape cassette may be housed, said tray having means for receiving one of the first cassette and the cassette adapter, the cassette adapter including an unloaded cassette detecting lever to detect whether or not the second tape cassette has been housed in the cassette adapter;

a lever detecting means, arranged at the ray, for detecting the unloaded cassette detecting lever, of the cassette adapter, to prevent the tray from being moved from the first to the second position when the unloaded cassette detecting lever is detected, wherein the lever detecting means comprises a through-hole formed in a side wall of the tray, said through-hole having a slope that increases from a front side of the tray toward a rear side of the tray so as to guide the unloaded cassette detecting layer; and a control means, associated with the lever detecting means, for reversing the carriage system so as to project the tray to the first position when the unloaded cassette detecting lever is detected.

* * * * *